(12) United States Patent
Gettings et al.

(10) Patent No.: US 9,801,013 B2
(45) Date of Patent: Oct. 24, 2017

(54) ELECTRONIC-DEVICE ASSOCIATION BASED ON LOCATION DURATION

(71) Applicant: LEEO, INC., Palo Alto, CA (US)

(72) Inventors: Adam M. Gettings, Red Wing, MN (US); Tianren Wang, Santa Clara, CA (US); Yi Zheng, Palo Alto, CA (US); Weiyang Yu, Santa Clara, CA (US); Brian Christensen, San Francisco, CA (US); Ellis Garai, Palo Alto, CA (US); Steven Sensarn, Palo Alto, CA (US); Andrew G. Stevens, Palo Alto, CA (US)

(73) Assignee: Leeo, Inc., San Mateo, CA (US)

( * ) Notice: Subject to any disclaimer, the term of this patent is extended or adjusted under 35 U.S.C. 154(b) by 5 days.

(21) Appl. No.: 14/935,288

(22) Filed: Nov. 6, 2015

(65) Prior Publication Data

US 2017/0134891 A1    May 11, 2017

(51) Int. Cl.
*H04W 4/02* (2009.01)
*H04W 64/00* (2009.01)

(52) U.S. Cl.
CPC ............. *H04W 4/02* (2013.01); *H04W 64/00* (2013.01)

(58) Field of Classification Search
CPC .................................. H04W 4/02; H04W 64/00
See application file for complete search history.

(56) References Cited

U.S. PATENT DOCUMENTS 900,595 A    10/1908    Sanders
988,665 A    4/1911    Ripson
(Continued)

FOREIGN PATENT DOCUMENTS

EP    1500955 A1    1/2005
GB    2454731 A    5/2009
(Continued)

OTHER PUBLICATIONS

Frear, Wm, "Making Soil and Crops Pay More", Crop Book Department of Virginia Carolina Chemical Co., (1918).
(Continued)

*Primary Examiner* — Nathan Mitchell
(74) *Attorney, Agent, or Firm* — Ashley Sloat; Steven Stupp; Aurora Consulting LLC

(57) ABSTRACT

A controller electronic device selectively associates one or more monitoring electronic devices and a viewing electronic device, so that the viewing electronic device can selectively access content acquired by the one or more monitoring electronic devices, such as captured images and/or measured acoustic information corresponding to sound in environments. In particular, the controller electronic device may receive messages with timestamps and current locations of a monitoring electronic device that is associated with the viewing electronic device. Based on a duration of time the monitoring electronic device is at a fixed or an approximately fixed location, the controller electronic device may establish the associations. For example, a maximum distance associated with the associations may increase as the duration of time increases. Alternatively, the controller electronic device may remove the associations when a difference between a current location of the monitoring electronic device and the fixed location exceeds a predefined value.

20 Claims, 15 Drawing Sheets

(56) References Cited

U.S. PATENT DOCUMENTS

| | | |
|---|---|---|
| 3,030,806 A | 4/1962 | Merlin |
| 3,499,664 A | 3/1970 | Burns |
| 3,722,501 A | 3/1973 | Derouineau |
| 3,767,933 A | 10/1973 | Bogue |
| 3,895,638 A | 7/1975 | Ito |
| 4,093,867 A | 6/1978 | Shah |
| 4,286,470 A | 9/1981 | Lynnworth |
| 4,418,333 A | 11/1983 | Schwarzbach |
| 4,450,436 A | 5/1984 | Massa |
| 4,772,126 A | 9/1988 | Allemand |
| 4,812,827 A | 3/1989 | Scripps |
| 4,829,283 A | 5/1989 | Spang |
| 4,896,039 A | 1/1990 | Fraden |
| 4,896,136 A | 1/1990 | Hotovy |
| 4,984,380 A | 1/1991 | Anderson |
| 5,003,486 A | 3/1991 | Hendel |
| 5,045,833 A | 9/1991 | Smith |
| 5,068,715 A | 11/1991 | Wade |
| 5,156,203 A | 10/1992 | Funakoshi |
| 5,159,315 A | 10/1992 | Schultz |
| 5,185,531 A | 2/1993 | Wynn |
| 5,192,271 A | 3/1993 | Kalb |
| 5,307,051 A | 4/1994 | Sedlmayr |
| 5,426,501 A | 6/1995 | Hokanson |
| 5,478,256 A | 12/1995 | Koganemaru |
| 5,492,482 A | 2/1996 | Lockman |
| 5,493,618 A | 2/1996 | Stevens |
| 5,532,660 A | 7/1996 | Smith |
| 5,578,995 A | 11/1996 | Bryant |
| 5,586,036 A | 12/1996 | Pintsov |
| 5,623,197 A | 4/1997 | Roseman |
| 5,646,591 A | 7/1997 | Issa |
| 5,675,070 A | 10/1997 | Gelperin |
| 5,745,670 A | 4/1998 | Linde |
| 5,801,297 A | 9/1998 | Mifsud |
| 5,855,494 A | 1/1999 | Blaszczyk |
| 5,905,436 A | 5/1999 | Dwight |
| 5,924,486 A | 7/1999 | Ehlers |
| 5,936,613 A | 8/1999 | Jaeger |
| 6,023,223 A | 2/2000 | Baxter |
| 6,023,233 A | 2/2000 | Craven |
| 6,074,089 A | 6/2000 | Hollander |
| 6,077,107 A | 6/2000 | Hetherington |
| 6,084,572 A | 7/2000 | Yaniger |
| 6,158,868 A | 12/2000 | Chien |
| 6,216,956 B1 | 4/2001 | Ehlers |
| 6,234,642 B1 | 5/2001 | Bokämper |
| 6,257,758 B1 | 7/2001 | Culbertson |
| 6,408,704 B1 | 6/2002 | Willeke |
| 6,415,205 B1 | 7/2002 | Myron |
| 6,428,334 B1 | 8/2002 | Skarie |
| 6,442,999 B1 | 9/2002 | Baumoel |
| 6,492,907 B1 | 12/2002 | McCracken |
| 6,542,234 B1 | 4/2003 | Ulrich |
| 6,554,439 B1 | 4/2003 | Teicher |
| 6,615,147 B1 | 9/2003 | Jonker |
| 6,672,129 B1 | 1/2004 | Frederickson |
| 6,677,573 B1 | 1/2004 | Nakata |
| 6,741,177 B2 | 5/2004 | Ballantyne |
| 6,753,776 B2 | 6/2004 | Drinkard |
| 6,753,786 B1 | 6/2004 | Apperson |
| 6,759,763 B2 | 7/2004 | Barton |
| 6,762,686 B1 | 7/2004 | Tabe |
| 6,772,052 B1 | 8/2004 | Amundsen |
| 6,828,909 B2 | 12/2004 | Script |
| 6,873,725 B2 | 3/2005 | Xu |
| 6,892,317 B1 | 5/2005 | Sampath |
| 6,950,017 B2 | 9/2005 | Smith |
| 6,981,943 B2 | 1/2006 | Noguchi |
| 6,991,029 B2 | 1/2006 | Orfield |
| 7,038,398 B1 | 5/2006 | Lys |
| 7,049,968 B2 | 5/2006 | Fitzgerald |
| 7,089,780 B2 | 8/2006 | Sunshine |
| 7,098,782 B1 | 8/2006 | Peckham |
| 7,116,213 B2 | 10/2006 | Thiesen |
| 7,119,789 B1 | 10/2006 | Shaw |
| 7,151,301 B2 | 12/2006 | Yoo |
| 7,155,317 B1 | 12/2006 | Tran |
| 7,166,796 B2 | 1/2007 | Nicoloau |
| 7,166,937 B2 | 1/2007 | Wilson |
| 7,227,652 B2 | 6/2007 | Cronch |
| 7,257,397 B2 | 8/2007 | Shamoon |
| 7,264,377 B2 | 9/2007 | Cooper |
| 7,287,738 B2 | 10/2007 | Pitlor |
| 7,304,129 B2 | 12/2007 | Saffell |
| 7,304,259 B2 | 12/2007 | Schwarz |
| 7,337,078 B2 | 2/2008 | Bond |
| RE40,437 E | 7/2008 | Rosen |
| 7,400,594 B2 | 7/2008 | Pereira |
| 7,405,524 B2 | 7/2008 | Null |
| 7,420,293 B2 | 9/2008 | Donnelly |
| 7,424,624 B2 | 9/2008 | Espinoza-Ibarra |
| 7,438,446 B1 | 10/2008 | McCann |
| 7,492,273 B2 | 2/2009 | Sharpe |
| 7,502,199 B2 | 3/2009 | Hori |
| 7,515,041 B2 | 4/2009 | Eisold |
| 7,520,607 B2 | 4/2009 | Casper |
| 7,522,036 B1 | 4/2009 | Preuss |
| 7,649,472 B1 | 1/2010 | Paterno |
| 7,673,525 B2 | 3/2010 | Huang |
| 7,685,861 B2 | 3/2010 | Lynch |
| 7,710,824 B1 | 5/2010 | Katzer |
| 7,714,536 B1 | 5/2010 | Silberg |
| 7,764,180 B2 | 7/2010 | Huang |
| 7,784,293 B2 | 8/2010 | Violand |
| 7,786,879 B2 | 8/2010 | Lax |
| 7,818,184 B2 | 10/2010 | Penny |
| 7,825,546 B2 | 11/2010 | Li |
| 7,828,463 B1 | 11/2010 | Willis |
| 7,874,695 B2 | 1/2011 | Jensen |
| 7,905,154 B2 | 3/2011 | Jones |
| 7,908,211 B1 | 3/2011 | Chen |
| 7,952,475 B2 | 5/2011 | Ivanov |
| 7,963,177 B2 | 6/2011 | Gysling |
| 7,992,332 B2 | 8/2011 | Lowenthal |
| 7,994,928 B2 | 8/2011 | Richmond |
| 8,018,327 B2 | 9/2011 | Nelson |
| 8,051,312 B2 | 11/2011 | Foley |
| 8,060,018 B2 * | 11/2011 | Davis ............... H04W 84/18 455/41.2 |
| 8,097,984 B2 | 1/2012 | Baarman |
| 8,113,069 B2 | 2/2012 | Settles |
| 8,125,194 B2 | 2/2012 | Nethken |
| 8,155,012 B2 | 4/2012 | Austermann |
| 8,170,722 B1 | 5/2012 | Elberbaum |
| 8,224,576 B2 | 7/2012 | Jensen |
| 8,242,640 B2 | 8/2012 | Lee |
| 8,255,090 B2 | 8/2012 | Frader-Thompson |
| 8,289,135 B2 | 10/2012 | Griffin |
| 8,301,271 B2 | 10/2012 | Lee |
| 8,314,590 B2 | 11/2012 | Chen |
| 8,335,936 B2 | 12/2012 | Jonsson |
| 8,350,406 B2 | 1/2013 | Byrne |
| 8,369,135 B1 | 2/2013 | Mani |
| 8,451,132 B1 | 5/2013 | Van Vleet |
| 8,463,452 B2 | 6/2013 | Masters |
| 8,466,626 B2 | 6/2013 | Null |
| 8,475,367 B1 | 7/2013 | Yuen |
| 8,483,112 B2 * | 7/2013 | Keshavarzian ......... H04L 47/10 340/539.15 |
| 8,489,437 B1 | 7/2013 | Dlott |
| 8,493,618 B2 | 7/2013 | Ishii |
| 8,523,758 B1 | 9/2013 | Kirby |
| 8,543,247 B2 | 9/2013 | Boss |
| 8,564,403 B2 | 10/2013 | Landau-Holdsworth |
| 8,583,843 B2 | 11/2013 | Rosso |
| 8,605,091 B2 | 12/2013 | Bradbury |
| 8,610,587 B2 | 12/2013 | Tropper |
| 8,636,271 B2 | 1/2014 | Check |
| 8,639,391 B1 | 1/2014 | Alberth |
| 8,660,582 B2 * | 2/2014 | Chen ............... H04W 4/14 455/456.1 |
| 8,683,236 B2 | 3/2014 | Ukita |
| 8,730,004 B2 | 5/2014 | Elfström |

(56) References Cited

U.S. PATENT DOCUMENTS

| | | | |
|---|---|---|---|
| 8,805,386 B2 * | 8/2014 | Cho | H04W 92/02 370/329 |
| 8,823,529 B2 | 9/2014 | Reed | |
| 8,897,804 B2 | 11/2014 | Couch | |
| 8,910,298 B2 | 12/2014 | Gettings | |
| 8,917,186 B1 | 12/2014 | Grant | |
| 9,064,394 B1 | 6/2015 | Trundle | |
| 2001/0007800 A1 | 7/2001 | Skarie | |
| 2002/0011947 A1 | 1/2002 | Stolarczyk | |
| 2002/0037026 A1 | 3/2002 | Sato | |
| 2002/0050932 A1 | 5/2002 | Rhoades | |
| 2002/0066019 A1 | 5/2002 | Amonou | |
| 2002/0069076 A1 | 6/2002 | Faris | |
| 2002/0073138 A1 | 6/2002 | Gilbert | |
| 2002/0095260 A1 | 7/2002 | Huyn | |
| 2002/0095269 A1 | 7/2002 | Natalini | |
| 2002/0097546 A1 | 7/2002 | Weinberger | |
| 2002/0152037 A1 | 10/2002 | Sunshine | |
| 2002/0170367 A1 | 11/2002 | Lieber | |
| 2003/0028270 A1 | 2/2003 | Peterson | |
| 2003/0059185 A1 | 3/2003 | Russell | |
| 2003/0074092 A1 | 4/2003 | Carrabis | |
| 2003/0194904 A1 | 10/2003 | Rupert | |
| 2003/0221118 A1 | 11/2003 | Walker | |
| 2003/0227220 A1 | 12/2003 | Biskup | |
| 2003/0227389 A1 | 12/2003 | McGreal | |
| 2003/0231495 A1 | 12/2003 | Searfoss | |
| 2004/0015572 A1 | 1/2004 | Kang | |
| 2004/0025604 A1 | 2/2004 | Call | |
| 2004/0030531 A1 | 2/2004 | Miller | |
| 2004/0069046 A1 | 4/2004 | Sunshine | |
| 2004/0075566 A1 | 4/2004 | Stepanik | |
| 2004/0147038 A1 | 7/2004 | Lewis | |
| 2004/0158193 A1 | 8/2004 | Bui | |
| 2004/0210155 A1 | 10/2004 | Takemura | |
| 2004/0215981 A1 | 10/2004 | Ricciardi | |
| 2005/0008127 A1 | 1/2005 | Holmes | |
| 2005/0045784 A1 | 3/2005 | Pitlor | |
| 2005/0073405 A1 | 4/2005 | Spoltore | |
| 2005/0111213 A1 | 5/2005 | Smith | |
| 2005/0136972 A1 | 6/2005 | Smith | |
| 2005/0148890 A1 | 7/2005 | Hastings | |
| 2005/0154494 A1 | 7/2005 | Ahmed | |
| 2005/0229452 A1 | 10/2005 | Shimasaki | |
| 2005/0276051 A1 | 12/2005 | Caudle | |
| 2005/0289378 A1 | 12/2005 | Vorenkamp | |
| 2006/0004492 A1 | 1/2006 | Terlson | |
| 2006/0119954 A1 | 6/2006 | Casper | |
| 2006/0173580 A1 | 8/2006 | Desrochers | |
| 2006/0236325 A1 | 10/2006 | Rao | |
| 2006/0238757 A1 | 10/2006 | Silcott | |
| 2006/0250236 A1 | 11/2006 | Ackley | |
| 2006/0250260 A1 | 11/2006 | Albert | |
| 2006/0272417 A1 | 12/2006 | Zanker | |
| 2006/0287783 A1 | 12/2006 | Walker | |
| 2007/0038334 A1 | 2/2007 | Chou | |
| 2007/0061393 A1 | 3/2007 | Moore | |
| 2007/0109121 A1 | 5/2007 | Cohen | |
| 2007/0132558 A1 | 6/2007 | Rowe | |
| 2007/0138307 A1 | 6/2007 | Khoo | |
| 2007/0155349 A1 | 7/2007 | Nelson | |
| 2007/0168088 A1 | 7/2007 | Ewing | |
| 2007/0173978 A1 | 7/2007 | Fein | |
| 2007/0182963 A1 | 8/2007 | Wright | |
| 2007/0219650 A1 | 9/2007 | Wang | |
| 2007/0225868 A1 | 9/2007 | Terlson | |
| 2007/0241615 A1 | 10/2007 | Goodrich | |
| 2007/0268687 A1 | 11/2007 | Scannell | |
| 2007/0276548 A1 | 11/2007 | Uzunovic | |
| 2007/0278285 A1 | 12/2007 | Ehrensvaerd | |
| 2008/0024089 A1 | 1/2008 | Meng | |
| 2008/0096620 A1 | 4/2008 | Lee | |
| 2008/0097809 A1 | 4/2008 | Stroman | |
| 2008/0106424 A1 | 5/2008 | Bouse | |
| 2008/0120296 A1 | 5/2008 | Kariathungal | |
| 2008/0123332 A1 | 5/2008 | Searfoss | |
| 2008/0143525 A1 | 6/2008 | Woodbury | |
| 2008/0155429 A1 | 6/2008 | Frank | |
| 2008/0173817 A1 | 7/2008 | Goldstein | |
| 2008/0204258 A1 | 8/2008 | Dayton | |
| 2008/0211683 A1 | 9/2008 | Curt | |
| 2008/0221714 A1 | 9/2008 | Schoettle | |
| 2008/0279287 A1 | 11/2008 | Asahina | |
| 2008/0291036 A1 | 11/2008 | Richmond | |
| 2008/0303678 A1 | 12/2008 | McCredy | |
| 2009/0012633 A1 | 1/2009 | Liu | |
| 2009/0031786 A1 | 2/2009 | Takeuchi | |
| 2009/0054799 A1 | 2/2009 | Vrtis | |
| 2009/0065596 A1 | 3/2009 | Seem | |
| 2009/0066513 A1 | 3/2009 | Kondo | |
| 2009/0073694 A1 | 3/2009 | Scannell | |
| 2009/0096620 A1 | 4/2009 | Kuo | |
| 2009/0105558 A1 | 4/2009 | Riley-Doucet | |
| 2009/0140898 A1 | 6/2009 | Ceballos | |
| 2009/0141898 A1 | 6/2009 | Huang | |
| 2009/0154148 A1 | 6/2009 | Meyer | |
| 2009/0157839 A1 | 6/2009 | Diederichs | |
| 2009/0193578 A1 | 8/2009 | Jang | |
| 2009/0195382 A1 | 8/2009 | Hall | |
| 2009/0225480 A1 | 9/2009 | Baxter | |
| 2009/0243597 A1 | 10/2009 | Spenik | |
| 2009/0271013 A1 | 10/2009 | Chen | |
| 2009/0278868 A1 | 11/2009 | Nakahira | |
| 2009/0290156 A1 | 11/2009 | Popescu | |
| 2009/0298957 A1 | 12/2009 | Gauthier | |
| 2009/0303031 A1 | 12/2009 | Strohallen | |
| 2010/0008286 A1 * | 1/2010 | Abedi | G01D 21/00 370/315 |
| 2010/0025449 A1 | 2/2010 | Longobardi | |
| 2010/0033329 A1 | 2/2010 | Davis | |
| 2010/0070619 A1 | 3/2010 | Chaganti | |
| 2010/0071008 A1 | 3/2010 | Hu | |
| 2010/0076615 A1 | 3/2010 | Daniel | |
| 2010/0090822 A1 | 4/2010 | Benson | |
| 2010/0101264 A1 | 4/2010 | Nishino | |
| 2010/0145543 A1 | 6/2010 | Middlemiss | |
| 2010/0161778 A1 | 6/2010 | Guinard | |
| 2010/0164711 A1 | 7/2010 | Arms | |
| 2010/0164742 A1 | 7/2010 | Anderson | |
| 2010/0182201 A1 | 7/2010 | Graczyk | |
| 2010/0191551 A1 | 7/2010 | Drance | |
| 2010/0198656 A1 | 8/2010 | Soroka | |
| 2010/0201536 A1 | 8/2010 | Robertson | |
| 2010/0214090 A1 | 8/2010 | Sartini | |
| 2010/0214417 A1 | 8/2010 | Gennari | |
| 2010/0228819 A1 | 9/2010 | Wei | |
| 2010/0235004 A1 | 9/2010 | Thind | |
| 2010/0249955 A1 | 9/2010 | Sitton | |
| 2010/0264871 A1 | 10/2010 | Matouka | |
| 2010/0274367 A1 | 10/2010 | Kaufman | |
| 2010/0277316 A1 | 11/2010 | Schlangen | |
| 2010/0279675 A1 * | 11/2010 | Slack | G06F 9/4843 455/419 |
| 2010/0296685 A1 | 11/2010 | Carle | |
| 2010/0298742 A1 | 11/2010 | Perlman | |
| 2010/0298957 A1 | 11/2010 | Sanchez Rocha | |
| 2010/0306033 A1 | 12/2010 | Oved | |
| 2010/0313748 A1 | 12/2010 | Schluter | |
| 2010/0318236 A1 | 12/2010 | Kilborn | |
| 2010/0323594 A1 | 12/2010 | Sun | |
| 2011/0003587 A1 | 1/2011 | Belz | |
| 2011/0007491 A1 | 1/2011 | Robinson | |
| 2011/0025499 A1 | 2/2011 | Hoy | |
| 2011/0027626 A1 | 2/2011 | Lattin | |
| 2011/0046792 A1 | 2/2011 | Imes | |
| 2011/0074596 A1 * | 3/2011 | Frohlick | G01D 21/00 340/691.1 |
| 2011/0082599 A1 | 4/2011 | Shinde | |
| 2011/0093281 A1 | 4/2011 | Plummer | |
| 2011/0095801 A1 | 4/2011 | Bjerregaard | |
| 2011/0108724 A1 | 5/2011 | Ewing | |
| 2011/0185198 A1 | 7/2011 | Ukita | |
| 2011/0187542 A1 | 8/2011 | Dittmer | |
| 2011/0202193 A1 | 8/2011 | Craig | |

(56) References Cited

U.S. PATENT DOCUMENTS

| | | |
|---|---|---|
| 2011/0216453 A1 | 9/2011 | Haines |
| 2011/0245988 A1 | 10/2011 | Ingels |
| 2011/0260851 A1 | 10/2011 | Richman |
| 2011/0270458 A1 | 11/2011 | Liu |
| 2011/0273283 A1 | 11/2011 | Schmuttor |
| 2011/0275960 A1 | 11/2011 | Westerink |
| 2011/0292446 A1 | 12/2011 | Kojima |
| 2011/0313582 A1 | 12/2011 | Van Megen |
| 2011/0316355 A1 | 12/2011 | Gruber |
| 2012/0004871 A1 | 1/2012 | Tsao |
| 2012/0022886 A1 | 1/2012 | Ohnemus |
| 2012/0023555 A1 | 1/2012 | Putterman |
| 2012/0025221 A1 | 2/2012 | Sakumoto |
| 2012/0041917 A1 | 2/2012 | Newton |
| 2012/0051714 A1 | 3/2012 | Reimnitz |
| 2012/0071008 A1 | 3/2012 | Sessford |
| 2012/0072755 A1 | 3/2012 | Jun |
| 2012/0082180 A1 | 4/2012 | Edwardson |
| 2012/0086402 A1 | 4/2012 | Carder |
| 2012/0087211 A1 | 4/2012 | Lee |
| 2012/0095610 A1 | 4/2012 | Chapel |
| 2012/0098439 A1 | 4/2012 | Recker |
| 2012/0105201 A1 | 5/2012 | Sanders |
| 2012/0109398 A1 | 5/2012 | Bhakta |
| 2012/0119714 A1 | 5/2012 | Jitaru |
| 2012/0124354 A1 | 5/2012 | Batwara |
| 2012/0130544 A1 | 5/2012 | Mohan |
| 2012/0154126 A1 | 6/2012 | Cohn |
| 2012/0161969 A1 | 6/2012 | Husen |
| 2012/0166642 A1 | 6/2012 | Saint Clair |
| 2012/0172027 A1* | 7/2012 | Partheesh .............. H04W 4/021 455/420 |
| 2012/0194082 A1 | 8/2012 | Huang |
| 2012/0197196 A1 | 8/2012 | Halbert |
| 2012/0206050 A1 | 8/2012 | Spero |
| 2012/0209634 A1 | 8/2012 | Ling |
| 2012/0229248 A1 | 9/2012 | Parshionikar |
| 2012/0229278 A1 | 9/2012 | Roosli |
| 2012/0258800 A1 | 10/2012 | Mikhailov |
| 2012/0265361 A1 | 10/2012 | Billingsley |
| 2012/0268136 A1 | 10/2012 | Lee |
| 2012/0271471 A1 | 10/2012 | Lee |
| 2012/0278101 A1 | 11/2012 | Homchowdhury |
| 2012/0280809 A1 | 11/2012 | Glenn |
| 2012/0283860 A1 | 11/2012 | Ho |
| 2012/0288124 A1 | 11/2012 | Fejzo |
| 2012/0303554 A1 | 11/2012 | Osann |
| 2012/0310703 A1 | 12/2012 | Cavalcanti |
| 2012/0314344 A1 | 12/2012 | Lam |
| 2012/0316661 A1 | 12/2012 | Rahman |
| 2012/0319593 A1 | 12/2012 | Jou |
| 2012/0319838 A1 | 12/2012 | Ly |
| 2012/0325023 A1 | 12/2012 | Calio |
| 2013/0006436 A1 | 1/2013 | Masters |
| 2013/0013967 A1 | 1/2013 | Gokhale |
| 2013/0019320 A1 | 1/2013 | Ericsson |
| 2013/0021720 A1 | 1/2013 | Ty |
| 2013/0024211 A1 | 1/2013 | Monteforte |
| 2013/0035599 A1 | 2/2013 | De Bruijn |
| 2013/0035992 A1 | 2/2013 | Silverman |
| 2013/0038470 A1 | 2/2013 | Niemeyer |
| 2013/0049466 A1 | 2/2013 | Adams |
| 2013/0049607 A1 | 2/2013 | Urata |
| 2013/0051543 A1 | 2/2013 | McDysan |
| 2013/0058116 A1 | 3/2013 | Galbas |
| 2013/0082817 A1 | 4/2013 | Gruenbacher |
| 2013/0083805 A1 | 4/2013 | Lu |
| 2013/0085609 A1 | 4/2013 | Barker |
| 2013/0085615 A1 | 4/2013 | Barker |
| 2013/0107041 A1 | 5/2013 | Norem |
| 2013/0119891 A1 | 5/2013 | Herremans |
| 2013/0135214 A1 | 5/2013 | Li |
| 2013/0141233 A1 | 6/2013 | Jacobs |
| 2013/0144644 A1 | 6/2013 | Simpson |
| 2013/0162821 A1 | 6/2013 | Park |
| 2013/0166089 A1 | 6/2013 | Craig |
| 2013/0174646 A1 | 7/2013 | Martin |
| 2013/0175132 A1 | 7/2013 | Battlogg |
| 2013/0179276 A1 | 7/2013 | Wheelon |
| 2013/0184880 A1 | 7/2013 | McMahon |
| 2013/0200254 A1 | 8/2013 | Johnson |
| 2013/0201033 A1 | 8/2013 | Cohn |
| 2013/0234625 A1 | 9/2013 | Kondo |
| 2013/0238153 A1 | 9/2013 | Warwick |
| 2013/0252638 A1* | 9/2013 | Yang .................... H04W 4/021 455/456.3 |
| 2013/0264889 A1 | 10/2013 | Quittek |
| 2013/0271015 A1 | 10/2013 | Peng |
| 2013/0275148 A1 | 10/2013 | Attaluri |
| 2013/0276144 A1 | 10/2013 | Hansen |
| 2013/0289919 A1 | 10/2013 | Wilson |
| 2013/0338839 A1 | 12/2013 | Rogers |
| 2013/0339766 A1 | 12/2013 | Chen |
| 2013/0346229 A1 | 12/2013 | Martin |
| 2014/0006506 A1 | 1/2014 | Frei |
| 2014/0025221 A1 | 1/2014 | Chapel |
| 2014/0028097 A1 | 1/2014 | Augur |
| 2014/0032003 A1 | 1/2014 | Chapel |
| 2014/0035749 A1 | 2/2014 | Reed |
| 2014/0046599 A1 | 2/2014 | Smith |
| 2014/0052300 A1 | 2/2014 | Matsuoka |
| 2014/0069131 A1 | 3/2014 | Masui |
| 2014/0070959 A1 | 3/2014 | Bhargava |
| 2014/0075220 A1 | 3/2014 | Song |
| 2014/0075496 A1 | 3/2014 | Prakash |
| 2014/0092765 A1 | 4/2014 | Agarwal |
| 2014/0098445 A1 | 4/2014 | Hooper |
| 2014/0099941 A1 | 4/2014 | Ji |
| 2014/0100700 A1 | 4/2014 | Matsumoto |
| 2014/0101346 A1 | 4/2014 | Naaman |
| 2014/0122140 A1 | 5/2014 | Rijnders |
| 2014/0141725 A1* | 5/2014 | Jesme .................. H04W 76/02 455/66.1 |
| 2014/0143149 A1* | 5/2014 | Aissi ................... G06F 21/31 705/44 |
| 2014/0143569 A1 | 5/2014 | Banerjee |
| 2014/0156084 A1 | 6/2014 | Rahman |
| 2014/0185646 A1 | 7/2014 | Mowry |
| 2014/0187162 A1* | 7/2014 | Mei ..................... H04W 4/023 455/41.2 |
| 2014/0188286 A1 | 7/2014 | Hunka |
| 2014/0233186 A1 | 8/2014 | Savelli |
| 2014/0236372 A1 | 8/2014 | Ewing |
| 2014/0253326 A1 | 9/2014 | Cho |
| 2014/0257572 A1 | 9/2014 | Mohan |
| 2014/0274147 A1* | 9/2014 | Kennedy ............... H04W 64/00 455/456.3 |
| 2014/0277869 A1 | 9/2014 | King |
| 2014/0281544 A1 | 9/2014 | Paczkowski |
| 2014/0283144 A1 | 9/2014 | Gettings |
| 2014/0292514 A1 | 10/2014 | Glenn |
| 2014/0340227 A1 | 11/2014 | Reed |
| 2014/0364089 A1 | 12/2014 | Lienhart |
| 2015/0021465 A1 | 1/2015 | Gettings |
| 2015/0049191 A1 | 2/2015 | Scalisi |
| 2015/0065161 A1* | 3/2015 | Ganesh ................. H04W 4/027 455/456.1 |
| 2015/0072663 A1* | 3/2015 | Chande ................. G06Q 10/10 455/414.1 |
| 2015/0179038 A1 | 6/2015 | Daniel |
| 2015/0195100 A1* | 7/2015 | Imes ..................... H04L 12/282 455/420 |
| 2015/0256623 A1 | 9/2015 | Ryhorchuk |
| 2015/0326701 A1 | 11/2015 | Robfogel |
| 2015/0365278 A1 | 12/2015 | Chakrabarti |
| 2016/0070276 A1 | 3/2016 | Joshi |
| 2016/0070614 A1 | 3/2016 | Joshi |
| 2016/0070920 A1 | 3/2016 | Joshi |
| 2016/0071148 A1 | 3/2016 | Joshi |
| 2016/0071183 A1 | 3/2016 | Joshi |
| 2016/0071184 A1 | 3/2016 | Joshi |
| 2016/0071219 A1 | 3/2016 | Joshi |

(56) References Cited

U.S. PATENT DOCUMENTS

| | | | |
|---|---|---|---|
| 2016/0127878 A1* | 5/2016 | Clarke | G08B 27/005 |
| | | | 705/324 |
| 2016/0183064 A1* | 6/2016 | Wouhaybi | H04W 4/08 |
| | | | 455/456.3 |
| 2016/0246473 A1 | 8/2016 | Jobs | |

FOREIGN PATENT DOCUMENTS

| | | |
|---|---|---|
| JP | 2002077324 A | 3/2002 |
| WO | WO-0133178 | 5/2001 |
| WO | WO-2005063006 | 7/2005 |
| WO | WO-2007148299 | 12/2007 |

OTHER PUBLICATIONS

Albea, "High Performance Control Desing for Dynamic Voltage Scaling Devices", IEEE Transactions on Circuits and Systems, Part 1, Regular Papers 58, 12, (Nov. 17, 2011), 2919-2930.

Baran, Paul, "Packet Switching", Fundamentals of Digital Switching, 2nd Ed., 193-234.

Brown, Rick, "Nest pulls Protect Smoke Detector from Retail on Safety Issue", CNET. [Online]. Retrieved from the Internet: <www.cnet.com>, (Apr. 3, 2014).

Carriazo-Osorio Fernando, "Impacts of Air Pollution on Property Values: An Economic Valuation for Bogota, Columbia", [Online]. Retrieved from the Internet: <http://www.demogr.mgp.de/papers/workshops/010518_paper02.pdf,8-19-2007>, (Aug. 19, 2007).

"Chapter Five Global Positioning System", Internet Archive Way Back Machine, Chapter Five Global Positioning System.

"Consumer Safety Notice for Nest Protect: Smoke + CO Alarm", Nest.com/letter-from-the-ceo, (May 22, 2014).

Dandamunda, Sivarama, "Interrupts", Fundamentals of Computer Organization and Design, 825-862.

Dijkman, Greg, "Scientific Gel and Blot Imaging: The difference between resolution and sensitivity with CCD cameras", [Online], Retrieved from the Internet: <gregdijkman.com/ccd-camera-imaging-sensitivity-resolution>.

"For $129, the best smoke detector on the market", CNET. Retrieved from the Internet: <http://www.cnet.com/products/nest-protect>, (Jul. 8, 2014).

Frederiksen, Rikard, "The optical sensitivity of compound eyes:theory and experiment compared", Bio. Lett., vol. 4, No. 6, (Dec. 23, 2008), 745-747.

"Guidance Regarding Methods for De-identification of Protected Health Information in Accordance with the Health Insurance Portability Act (HIPAA) Privacy Rule", Department of Health and Human Services. [Online]. Retrieved from the Internet: <http://www.hhs.gov/ocr/privacy/hippa/understanding/coveredentities/De-identification/guidance.html>, (Dec. 1, 2012).

Hayashi, "A Network-Centric approach to Sensor-data and Service Integration", SICE Annual Conference, (Sep. 13, 2011), 2037-2042.

Huang, "Pervasive, Secure Access to a Hierarchical Sensor-Based Healthcare Monitoring Architecture in Wireless Heterogeneous Networks", IEEE Journal on Selected Areas in Communication, vol. 27, No. 4, 400-411.

Mainwing, "Wireless Sensor Networks for Habitat Monitoring", WNSA '02, (Sep. 28, 2002), 88-97.

McCracken, Harry, "Nest's Smoke Detector Recall; Doesn't Mean You Need to Send Yours Back", Tech Technologizer. [Online]. Retrieved from the Internet: <www.time.com>, (May 21, 2014).

Miyaho, "Sensor Network Management for Healthcare applications", 2010 IEEE Computer Society, 14-20.

Moffat, "Notes on Using Thermocouples", [Online]. Retrieved from the Internet: <http://www.electronics-cooling.com/1197/01/notes-on-using-thermocouples/>, 1-9.

Mogg, Trevor, "Nest Recall 440,000 Protect Smoke alarms, Issues Software Update that fixes Glitch", [Online]. Retrieved from the Internet: <www.diaital trands.com>, (May 21, 2014).

"Nest Labs Recall to Repair Nest Protect Smoke + CO Alarms Due to Failure to Sound Alert", [Online]. Retrieved from the Internet: <http://www.cpsc/gov/en/Recalls/2014/Nest-Labs-Recalls-to-Repair-Nest-protect-Smoke-CO-Alarms>, (May 21, 2014).

"Nest Protect", Manual, (Oct. 1, 2013).

Noh, "Design of a Room Monitoring System for Wireless Sensor Networks", (Jul. 1, 2013), 1-7.

"Optical Resolution", en.wikipedia.org/wiki.Optical_resolution, (Mar. 1, 2012).

"Privacy Protector:6 Good Reasons to De-Indentify Data", [Online]. Retrieved from the Internet: <http://privacyguidance.com/blog/6-good-reasons-to-de-identify-data>, (Mar. 1, 2012).

"Resolution and Sensitivity", [Online]. Retrieved from the Internet: <www.atnf.csiro.au/outreach/education/senior/astrophysics/resolution_sensitivity.html>.

Steenerson, Christopher E, "Education in Microscopy and Digital Imaging", [Online]. Retrieved from the Internet: <zeiss-campus.magnets.fsu.edututorials/basics/spatialfrequency/indexfalsh.html/>, (Dec. 5, 2011).

"Symptom—Definition by Merriam-Webster", [Online]. Retrieved from the Internet: http://www.merriam-webster.com/medical/symptom/.

"Tutorial on Spatial Frequency Analysis", [Online]. Retrieved from the Internet: <www.psy.vanderbilt.edu/courses/hon185/SpatialFrequency/SpatialFrequency.html>, (Apr. 4, 2014).

"What is Nest Wave and how does it work?", [Online]. Retrieved from the Internet: <support/nest.com/articie/what-is-nest-wave-and-how-does-it-work>, (Apr. 4, 2014).

Yildiz, "Potetential ambient Energy-Harvesting Sources and Techniques", The Journal of Technology Studies, vol. 35, No. 1. [Online]. Retrieved from the Internet: <http://scholar.lib.vt.edu/ejournals/JOTS/v35lv35n1/yidliz.html>, (Nov. 9, 2014), 1-14.

* cited by examiner

ELECTRONIC-DEVICE ASSOCIATION BASED ON LOCATION DURATION

BACKGROUND

Field

The described embodiments relate to techniques for associating electronic devices. In particular, the described embodiments relate to techniques for associating an electronic device with electronic devices at increasing distances based on a duration the electronic device is at a fixed location.

Related Art

The capabilities of many portable electronic devices continue to increase. For example, while additional functionality is usually included in new models of portable electronic devices (such as cellular telephones), often the additional functionality is included in new versions of an operating system that is executed by the portable electronic devices. In principle, such software updates allow the capabilities of a portable electronic device to be routinely increased over its operating life.

However, the new versions of the operating system typically consume additional resources in the portable electronic devices. For example, a new version of the operating system may require more memory and processor computational capability. Therefore, the new version of the operating system may increase power consumption and, thus, may reduce battery life. Consequently, software updates often cause users to consider older models of portable electronic devices obsolete, which can lead users to replace them with newer models.

While the users may consider the older models of the portable electronic devices as unsuitable for their original intended purpose, many users do not discard the older models of the portable electronic devices. However, because the resources in the older models of the portable electronic devices are often unable to support the latest versions of the operating system, their remaining capabilities are typically unused, which constitutes a significant waste and an opportunity cost for the users.

Hence, there is a need for a technique that addresses the above-described problems.

SUMMARY

A group of embodiments relates to a controller electronic device. This controller electronic device includes an interface circuit that, during operation, communicates with a viewing electronic device that operates in a viewing mode in an environment, a monitoring electronic device associated with the viewing electronic device that operates in a monitoring mode, and second monitoring electronic devices that operate in the monitoring mode in second environments. Moreover, the controller electronic device includes: a memory that stores a program module; and a processor that, during operation, executes the program module. In particular, during operation, the processor receives messages that include timestamps and current locations of the monitoring electronic device. Then, the processor associates the viewing electronic device with a subset of the second monitoring electronic devices based on a duration of time that the monitoring electronic device is approximately at a fixed location. Note that a size of the subset increases as the duration of time increases, and the associations allow the viewing electronic device to selectively access content, including acoustic information corresponding to sound and images for the second environments, from the subset of the second monitoring electronic devices. Furthermore, the processor removes the associations when a difference between a current location of the monitoring electronic device and the fixed location exceeds a predefined value.

Moreover, the subset of the second monitoring electronic devices may be located within a distance from the fixed location, and the distance may increase as the duration of time increases. Alternatively or additionally, the subset of the second monitoring electronic devices may be located within an adjacency value from the fixed location, and the adjacency value may increase as the duration of time increases.

Furthermore, the processor may receive credentials from the viewing electronic device and the subset of the second monitoring electronic devices, and associating the viewing electronic device and the subset of the second monitoring electronic devices may involve providing the credentials to the viewing electronic device and the subset of the second monitoring electronic devices. Additionally, the processor may receive encryption keys from the viewing electronic device and the subset of the second monitoring electronic devices, and associating the viewing electronic device and the subset of the second monitoring electronic devices may involve providing the encryption keys to the viewing electronic device and the subset of the second monitoring electronic devices. In some embodiments, the processor generates the encryption keys for the viewing electronic device and the subset of the second monitoring electronic devices, and associating the viewing electronic device and the subset of the second monitoring electronic devices may involve providing the encryption keys to the viewing electronic device and the subset of the second monitoring electronic devices.

Moreover, the processor may associate the monitoring electronic device with a second viewing electronic device that is associated with one of the second monitoring electronic devices. The association between the monitoring electronic device with the second viewing electronic device may allow the second viewing electronic device to selectively access content, including images and acoustic information corresponding to sound, for the environment. Furthermore, the processor may receive credentials from the monitoring electronic device and the second viewing electronic device, and associating the monitoring electronic device and the second viewing electronic device may involve providing the credentials to the monitoring electronic device and the second viewing electronic device. Additionally, the processor may receive encryption keys from the monitoring electronic device and the second viewing electronic device, and associating the monitoring electronic device and the second viewing electronic device may involve providing the encryption keys to the monitoring electronic device and the second viewing electronic device. In some embodiments, the processor generates the encryption keys for the monitoring electronic device and the second viewing electronic devices, and associating the monitoring electronic device and the second viewing electronic device involves providing the encryption keys to the monitoring electronic device and the second viewing electronic device.

Note that, by receiving the messages and associating the viewing electronic device with the subset of the second monitoring electronic devices, the controller electronic device may establish selective access to the content when the viewing electronic device is outside of communication range with the subset of the monitoring electronic devices.

Another embodiment provides a computer-program product for use in conjunction with the electronic device. This computer-program product may include instructions for at least some of the aforementioned operations performed by the electronic device.

Another embodiment provides a method for facilitating environmental monitoring. This method may include at least some of the aforementioned operations performed by the electronic device.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

Figure 1:
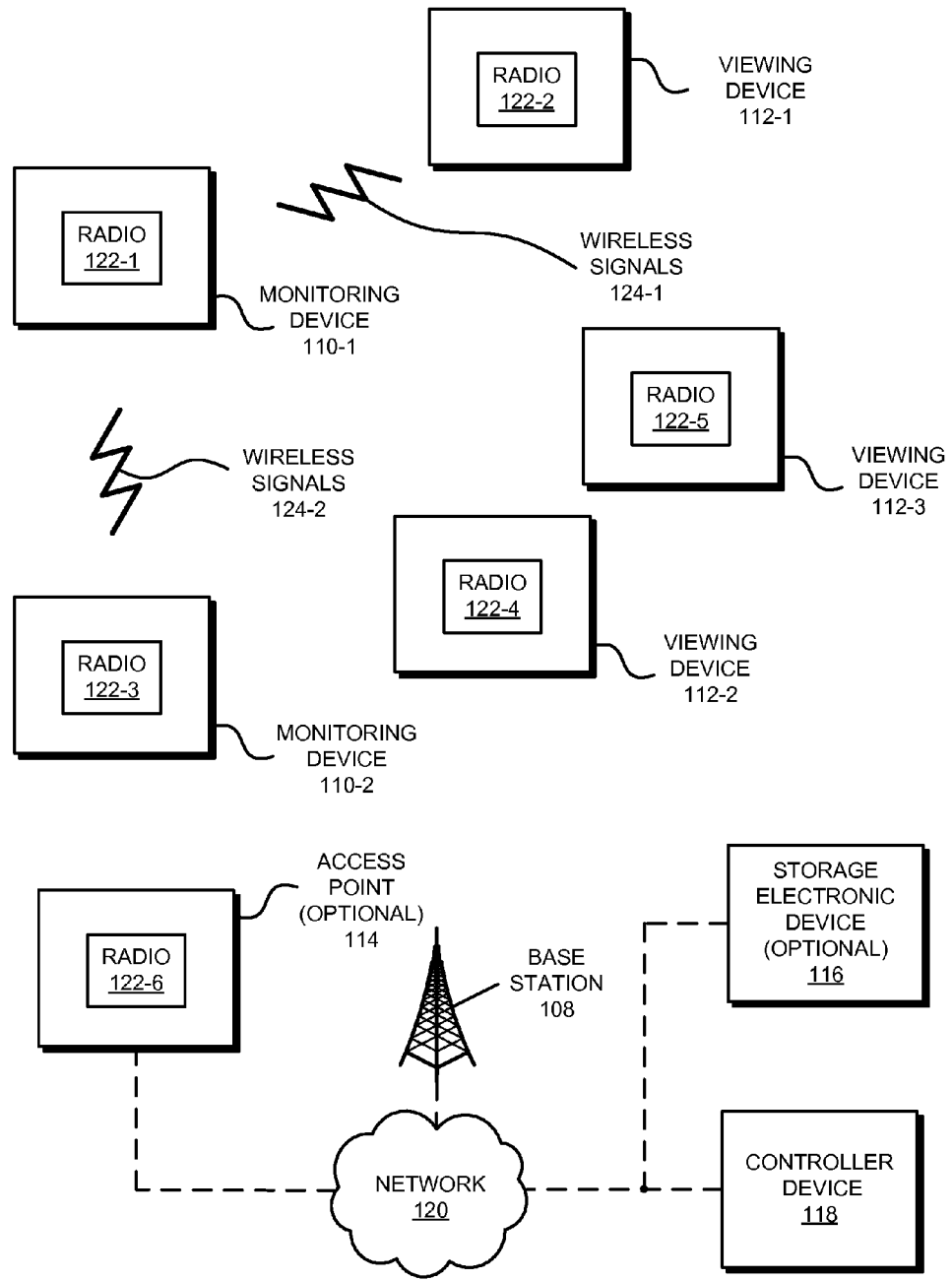
FIG. 1 is a block diagram illustrating electronic devices communicating in accordance with an embodiment of the present disclosure.

Table 1 provides pseudo-code for use with one of the electronic devices of FIG. 1 in accordance with an embodiment of the present disclosure.

Table 2 provides pseudo-code for use with one of the electronic devices of FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In a group of embodiments, a controller electronic device selectively associates one or more monitoring electronic devices and a viewing electronic device, so that the viewing electronic device can selectively access content acquired by the one or more monitoring electronic devices, such as captured images and/or measured acoustic information corresponding to sound in environments. In particular, the controller electronic device may receive messages with timestamps and current locations of a monitoring electronic device that is associated with the monitoring electronic device. Based on a duration of time the monitoring electronic device is at a fixed or an approximately fixed location, the controller electronic device may establish associations between the viewing electronic device and the one or more monitoring electronic devices. For example, the number of associations and/or a maximum distance associated with the associations may increase as the duration of time increases. Alternatively, the controller electronic device may remove the associations when a difference between a current location of the monitoring electronic device and the fixed location exceeds a predefined value.

By dynamically expanding the spatial extent of the associations the longer the monitoring electronic device remains at the fixed or the approximately fixed location, this association technique may allow a network of monitoring electronic devices to be built or assembled over time. In particular, the controller electronic device may associate the viewing electronic device with a group of monitoring electronic devices covering an area of increasing spatial extent, while reducing the likelihood that unsuitable parties will gain access to shared content, such as the captured images and/or the measured acoustic information in the environments. Therefore, the controller electronic device may enable a dynamic network of monitoring electronic devices, such as a dynamic neighborhood watch. In the process, the controller electronic device may allow users to avoid waste and the opportunity cost of unused legacy electronic devices, which may increase user satisfaction.

Communication between electronic devices (such as the monitoring electronic devices, the viewing electronic devices and/or the controller electronic device) may utilize wired, optical and/or wireless communication. For example, the wireless communication may involve communicating packets or frames that are transmitted and received by radios in the electronic devices in accordance with a communication protocol, such as: Bluetooth® (from the Bluetooth Special Interest Group of Kirkland, Wash.), an Institute of Electrical and Electronics Engineers (IEEE) 802.15 standard (such as ZigBee® from the ZigBee® Alliance of San Ramon, Calif.), an Institute of Electrical and Electronics Engineers (IEEE) 802.11 standard, Z-Wave, a power-line communication standard, an infra-red communication standard, a universal serial bus (USB) communication standard, a near-field-communication standard or specification (from the NFC Forum of Wakefield, Mass.), another wireless ad-hoc network standard, and/or another type of wireless interface. In some embodiments, the communication protocol may be compatible with a $2^{nd}$ generation or mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{rd}$ generation of mobile telecommunications technology (such as a communication protocol that complies with the International Mobile Telecommunications Advanced specification by the International Telecommunication Union of Geneva, Switzerland), and/or another cellular-telephone communication technique. For example, the communication protocol may include Long Term Evolution or LTE. In addition, the communication may occur via a wide variety of frequency bands, including frequencies associated with the so-called 'white space' in frequencies bands associated with analog television broadcasting.

The communication between the electronic devices is shown in FIG. 1, which presents a block diagram illustrating communication among optional base station 108, monitoring electronic devices 110, viewing electronic devices 112, optional access point 114, one or more optional storage electronic devices (such as optional storage electronic device 116), and/or one or more controller electronic devices (such as controller electronic device 118) via network 120 (such as a cellular-telephone network, the Internet, a wireless local area network, an Ethernet network, an intra-net, an optical network, etc.). In particular, the communication in FIG. 1 may involve the exchange of packets. These packets may be included in frames in one or more channels.

Moreover, as described further below with reference to FIG. 15, monitoring electronic devices 110, viewing electronic devices 112, optional access point 114, optional storage electronic device 116, and/or controller electronic device 118 may include subsystems, such as: a networking subsystem, a memory subsystem, a processing subsystem, an optional user-interface subsystem, and an optional sensor subsystem. In addition, these electronic devices may include radios 122 in the networking subsystems. More generally, monitoring electronic devices 110, viewing electronic devices 112, optional access point 114, optional storage electronic device 116, and/or controller electronic device 118 can include (or can be included within) any electronic devices with networking subsystems that enable wirelessly or wired communication with another electronic device. This can comprise transmitting frames on wireless channels to enable the electronic devices to make initial contact, followed by exchanging subsequent data/management frames (such as connect requests or petitions to establish a connection or link), configuring security options (e.g., encryption on a link or in a mesh network), transmitting and receiving packets or frames, etc.

As can be seen in FIG. 1, wireless signals 124 (represented by jagged lines) are transmitted from/received by radios (such as radios 122) in optional base station 108, monitoring electronic devices 110, viewing electronic devices 112 and/or optional access point 114 (which may allow monitoring electronic device 110-2 and/or viewing electronic device 112-3 to wirelessly access network 120 via a wireless local area network). In general, wireless communication among these electronic devices may or may not involve a connection being established among the electronic devices, and therefore may or may not involve communication via a wireless network. (Note that the communication with optional storage electronic device 116, and/or controller electronic device 118 may occur via network 120, which may involve wired or optical communication with a different communication protocol than wireless signals 124.)

Furthermore, the processing of a packet or frame in an electronic device (such as monitoring electronic device 110-1) may include: receiving wireless signals 124 with the packet or frame; decoding/extracting the packet or frame from received wireless signals 124 to acquire the packet or frame; and processing the packet or frame to determine information contained in the packet or frame (such as at least a portion of a data packet).

Figure 2:
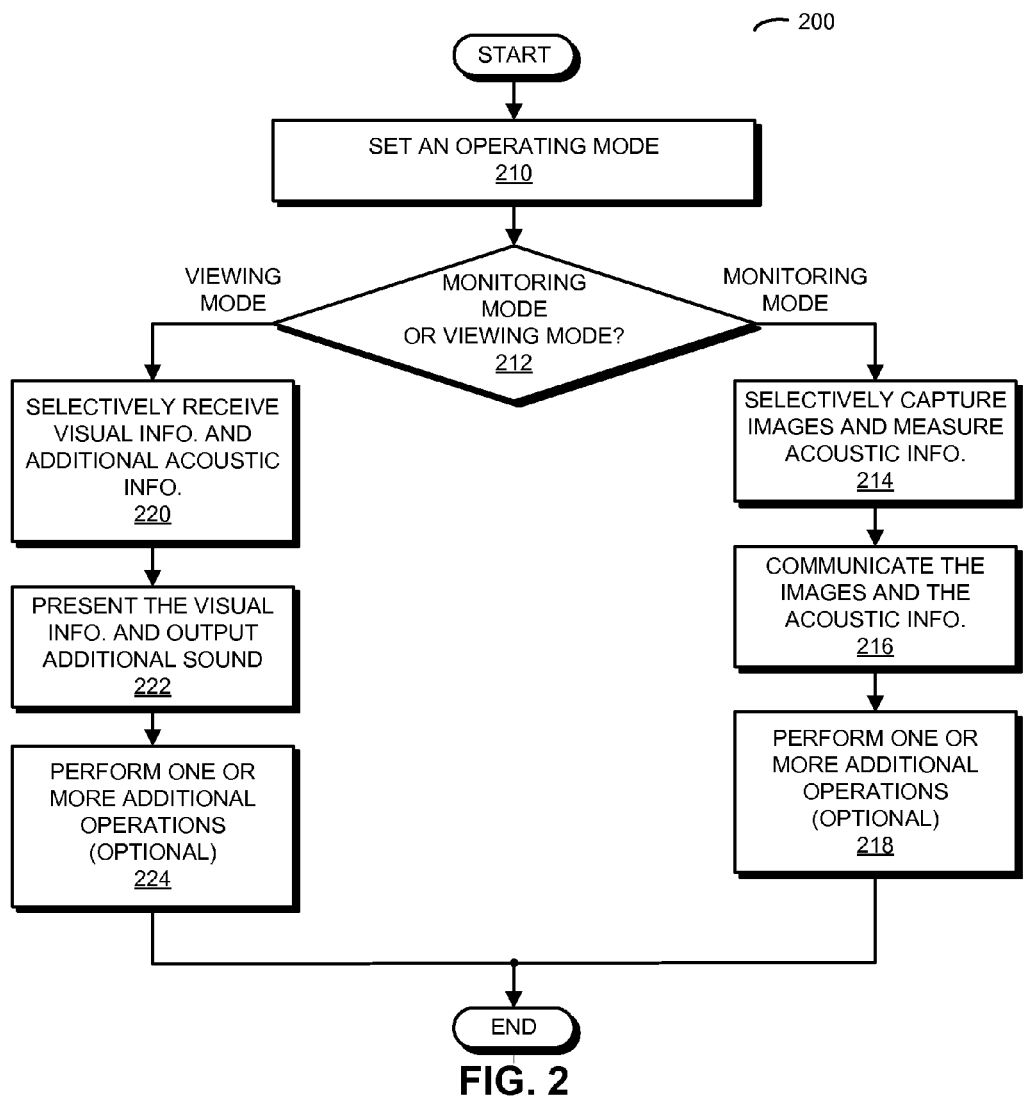
FIG. 2 is a flow diagram illustrating a method for facilitating environmental monitoring in FIG. 1 in accordance with an embodiment of the present disclosure.

As described further below with reference to FIGS. 2 and 3, monitoring electronic devices 110 and viewing electronic devices 112 may be arranged into at least pairs. For example, one of viewing electronic devices 112 (such as viewing electronic device 112-1) may be paired with or associated with one or more of monitoring electronic devices 110 (such as monitoring electronic device 110-1). In particular, a given user may own or may be associated with a given pairing. Moreover, monitoring electronic devices 110 and viewing electronic devices 112 may execute instances of a program module. This program module may allow monitoring electronic devices 110 and viewing electronic devices 112 to be operated in a monitoring mode or a viewing mode. When an electronic device executing an instance of the program module is operated in the monitoring mode, it is referred to as a 'monitoring electronic device' (such as one of monitoring electronic devices 110). Similarly, when an electronic device executing an instance of the program module is operated in the viewing mode, it is referred to as a 'viewing electronic device' (such as one of viewing electronic devices 112). Note that a user may select the monitoring mode or the viewing mode for a given electronic device (e.g., using a user interface, as described further below with reference to FIG. 4). Alternatively, the given electronic device may select the monitoring mode or the viewing mode based on its location (such as whether it is at the same location for an extended time interval, e.g., several hours, one or more days, etc.).

Figure 6:
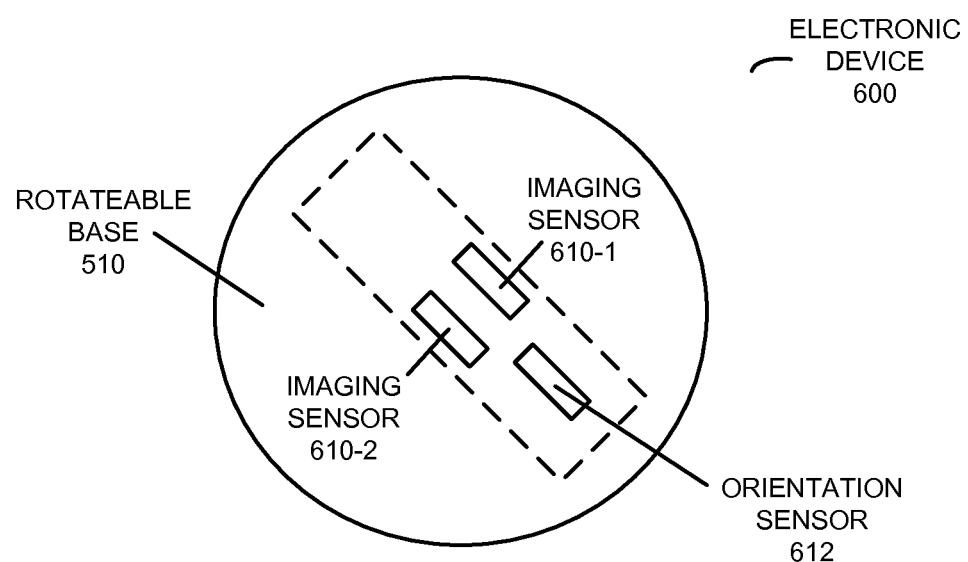
FIG. 6 is a drawing illustrating a top view of an electronic device in FIG. 5 in accordance with an embodiment of the present disclosure.

As described further below with reference to FIG. 6, in the monitoring mode a given one of monitoring electronic devices 110 (such as monitoring electronic device 110-1) may monitor an environment that includes monitoring electronic device 110-1 or that is proximate to the environment that includes monitoring electronic device 110-1 (which is sometimes referred to as an 'external environment'). For example, monitoring electronic device 110-1 may monitor the environment within a building (such as a region, a room, etc.), an object (such as a car, a truck, a container, a package, etc.), etc. Alternatively or additionally, monitoring electronic device 110-1 may monitor the external environment outside of the building (such as a region adjacent to the building, the outside of the building, etc.), the object, etc. In an exemplary embodiment, monitoring electronic device 110-1 may include at least two imaging sensors (such as two cameras), one of which monitors an interior of an environment (such as a room in a house) and the other monitors a region outside of the environment (such as a region outside of a house). Thus, at least the two imaging sensors may have different fields of view.

When monitoring the environment and/or the external environment, monitoring electronic devices 110 may include sensors that at least selectively capture images and/or measure acoustic information corresponding to sound that characterize events (and, more generally, conditions, such as environmental conditions, e.g., temperature, humidity, air quality, etc.). For example, an acoustic sensor (such as a microphone) in monitoring electronic device 110-1 may detect an acoustic event, such as: insertion of a key into a lock, a sound exceeding a threshold level (e.g., 60-80 dB), a type of sound (e.g., a fire alarm, breaking glass, a moving car, yelling or shouting, cursing, a cry for help, a gunshot, etc.) and/or activation of acoustic sources in the environment having a predefined or a predetermined phase relationship (e.g., smoke and/or carbon-monoxide detectors at different locations in a building, which have different acoustic latencies to a location of monitoring electronic device 110-1. In response, monitoring electronic device 110-1 may capture the images and measure the acoustic information corresponding to or that represents sound. (While images and/or acoustic information are used as illustrations of the type of information selectively captured or measured by monitoring electronic devices 110, in some embodiments additional types of measures are performed by at least some of monitoring electronic devices 110 when these monitoring electronic devices include additional sensors.)

Alternatively or additionally, monitoring electronic device 110-1 may detect motion in the environment and/or the external environment (e.g., using a motion detector and/or by comparing images acquired at different times using an imaging sensor), and in response monitoring electronic device 110-1 may capture additional images and/or may measure the acoustic information. In some embodiments, an occurrence of an event is determined based on a history of events for an environment and/or the external environment, such as by comparing the measured acoustic information with a history of acoustic events and/or by comparing a captured image (or difference of two images) with historical motion events to determine if something anomalous or usual is occurring.

In some embodiments, monitoring electronic device 110-1 may at least selectively capture the images and measure the acoustic information based on an alert about an occurrence of an event in the environment that is received from a governmental organization. For example, a municipality (such as a city government) or a police department may provide the alert in response to a burglary or criminal activity nearby, and in response monitoring electronic device 110-1 may captures images and/or acoustic information. This content may be subsequently shared or provided to the governmental organization.

Figure 5:
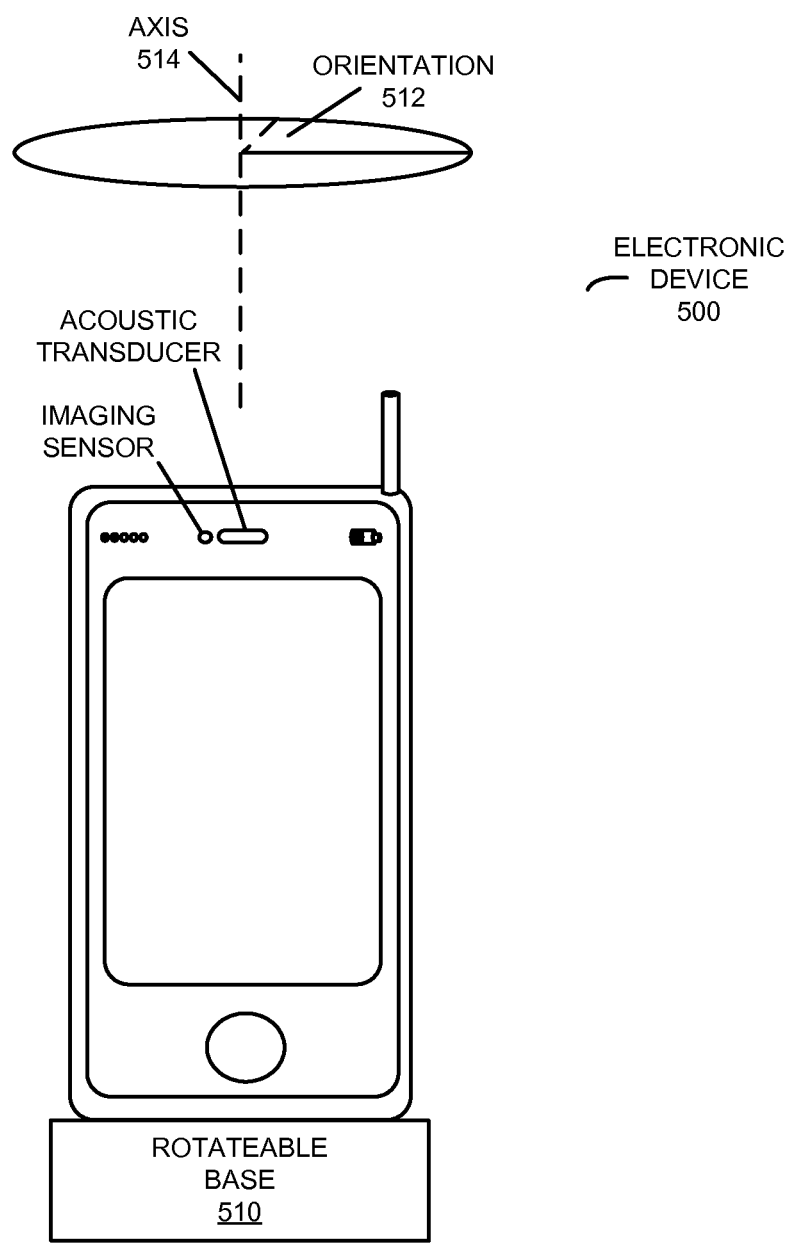
FIG. 5 is a drawing illustrating an electronic device in FIG. 1 in accordance with an embodiment of the present disclosure.

As described further below with reference to FIG. 5, when an event occurs, a rotatable base may change an angular orientation during the selective capture of the images and measurement of the acoustic information. For example, monitoring electronic device 110-1 may analyze the measured acoustic information from multiple microphones (or acoustic transducers) to determine a location of a source or to track movement of the source, and then, via the rotatable base, may change the angular orientation so that the imaging sensor faces the source or keeps the source centered in a field of view of the imaging sensor (which may involve dynamically rotating the rotatable base to follow the motion of the source). Alternatively or additionally, a voice or sound recognition technique may be used to identify a particular source (such as a person) in a crowded acoustic environment and, then, monitoring electronic device 110-1 may be rotated to follow this source as it moves in the environment.

After capturing the images and/or measuring the acoustic information, monitoring electronic device 110-1 may compute analysis results based on the captured images and/or the measured acoustic information. The analysis results may indicate safety conditions, activities, environmental conditions and, more generally, events in the environment and/or the external environment. For example, by analyzing the captured images and/or the measured acoustic information monitoring electronic device 110-1 may determine the presence of: activation of an alarm (such as a smoke detector, a carbon-monoxide detector, a dual smoke detector and carbon-monoxide detector, a car alarm, a burglar alarm and/or another alarm), fire, flooding, carbon monoxide, a power outage, a chemical contaminant, an infestation, opening of a door, an individual entering or leaving a room, an individual getting out of bed, an individual waking up, an individual crying, an individual tossing and turning in bed, an individual shivering, a change in health condition of an individual (such as an illness, a chronic disease, etc.), a crime in progress, unusual activity or other irregular occurrences (such as a unusual vehicle driving down the street), delivery of the mail or a package, etc.

In an exemplary embodiment, monitoring electronic device 110-1 detects an audible acoustic alert or alarm based on sound intensity, time-domain information and/or or frequency-domain information in temporal audio samples of the sound received by a microphone. For example, the sound may include a temporal 3 acoustic pattern, with a beep, pause and an alarm pattern or signal, which is compatible with an American National Standards Institute standard S3.42 1990. In order to facilitate this capability, monitoring electronic device 110-1 may be calibrated to: confirm that the alarm can be heard or detected by monitoring electronic device 110-1, identify the alarm device (such as a smoke detector), determine the location of the alarm device, and/or determine an acoustic characteristic of the environment (e.g., based on sound output by monitoring electronic device 110-1 and/or from another acoustic source). This calibration may occur when: monitoring electronic device 110-1 is first installed or used, after a time interval (such as every 3 or 6 months) and/or when the environment is changed (such as when one or more objects in the environment are moved, when monitoring electronic device 110-1 is moved, etc.). Note that the acoustic characteristic may include: a location of the alarm device (such as a location of the alarm device relative to monitoring electronic device 110-1); a detection threshold for monitoring electronic device 110-1 at its current location to use when determining if the alarm device is activated; and/or an acoustic transfer function (such as an amplitude and/or phase as a function of frequency) or an acoustic profile (such as an acoustic latency or a delay of an echo) of the environment proximate to the alarm device and monitoring electronic device 110-1. Moreover, the location of the alarm device may be specified by or determined from: an image of the environment, a positioning system (such as the Global Positioning System or GPS), a communication network (such as a cellular-telephone network), and/or an acoustic latency in the environment. In some embodiments, the location is determined by trilateration, triangulation, and/or the acoustic characteristic of the environment. For example, the location may be determined using multiple microphones. Thus, the location may be absolute or relative (such as a position in the environment relative to monitoring electronic device 110-1).

Once a given monitoring electronic device (such as monitoring electronic device 110-1) has captured the images and/or measured the acoustic information, monitoring electronic device 110-1 may share this content (as well as analysis results) with one or more of the other electronic devices in FIG. 1. For example, monitoring electronic device 110-1 may provide the content or an alert or notification indicating that such content is available to at least viewing electronic device 112-1 (i.e., one or more other electronic devices with which monitoring electronic device 110-1 is paired). In some embodiments, monitoring electronic device 110-1 and at least viewing electronic device 112-1 have or establish a peer-to-peer connection, which allows them to communicate via peer-to-peer communication. Note that the peer-to-peer connection may allow one-to-one or one-to-many communication (such as with a group of paired or associated electronic devices).

In response to receiving the content or the alert, viewing electronic device 112-1 may access and then may display at least some of the images and/or may output the sound, thereby allowing a user to remotely monitor the event(s) in the environment and/or the external environment. Alternatively, viewing electronic device 112-1 may present the alert to the user, which may allow the user to decide whether to selectively access the content. For example, the alert may be presented to the user in a user interface. This user interface may include or specify a notification about the environmental and/or the external environment, such as an alarm sounding, and may include one or more icons that allow the individual to: listen to an audio recording of the measured sounds associated with an event, contact emergency services, and/or indicate that the event is a false positive.

Furthermore, as described further below, monitoring electronic device 110-1 may share the content and/or the alert with one or more additional viewing electronic devices in viewing electronic device 112 that are paired or associated with monitoring electronic device 110-1, and that are used by other users. For example, the other users may include: an emergency contact specified by a user or an owner of viewing electronic device 112-1; users that the user or the owner of viewing electronic device 112-1 has allowed to access the content and/or the alert; representatives of an insurance company (who may provide a discount on the user's homeowner's insurance in exchange for the monitoring); and/or an owner of a building that includes the environment. In some embodiments, monitoring electronic device 110-1 provides the content and/or the alert to optional storage electronic device 116, where it may be subsequently accessed by viewing electronic device 112-1 and/or the one or more additional viewing electronic devices. In some embodiments, optional storage electronic device 116 stores the content in a secure, certified historical record or log of the conditions of the environment and/or the external environment (such as a time record of the safety conditions, the activities, the environmental conditions and, more generally, the events). Note that optional storage electronic device 116 may analyze the content, and thus may store and provide analysis results to viewing electronic device 112-1 and/or the one or more additional viewing electronic devices.

Moreover, monitoring electronic device 110-1 may restrict the type of content that is shared with the one or more additional viewing electronic devices. For example, monitoring electronic device 110-1 may only share content (such as images and/or acoustic information) for the external environment with the one or more additional viewing electronic devices. In particular, monitoring electronic device 110-1 may include an orientation sensor that allows monitoring electronic device 110-1 to determine an orientation of monitoring electronic device 110-1, so that monitoring electronic device 110-1 can identify and only share images of the external environment with the one or more additional viewing electronic devices, thereby enabling collective monitoring (such as a virtual 'neighborhood watch') of a street or an outside region by multiple users, while protecting the privacy of the users.

Furthermore, the content provided by monitoring electronic device 110-1 and/or optional storage electronic device 116 may be protected. This may involve encryption using an encryption key (such as an encryption key associated with monitoring electronic device 110-1). The encryption key may use symmetric or asymmetric encryption techniques. Alternatively or additionally, a secure or one-way cryptographic hash function (such as SHA-256) may be used. As described further below with reference to FIGS. 7-14, when associations are established between at least pairs of monitoring electronic devices 110 and viewing electronic devices 112, credentials used to access content, encryption keys and/or information specifying cryptographic hash functions may be exchanged to facilitate controlled and secure sharing of the content.

In an exemplary embodiment, monitoring electronic devices 110 and viewing electronic devices 112 are cellular telephones. At least monitoring electronic devices 110 may be one or more 'older' models (i.e., legacy electronic devices). In particular, monitoring electronic devices 110 and/or viewing electronic devices 112 may execute one or more older or previous versions of operating systems that current or latest versions of the one or more operating systems. This may be the case because a current or latest version of an operating system may exceed the hardware capabilities of monitoring electronic devices 110 and/or viewing electronic devices 112. For example, when monitoring electronic devices 110 and/or viewing electronic devices 112 execute the current or latest version of the operating system: an operating life of a power source (such as a battery) may be less than a predefined value (such as several hours); an execution speed of a program module may be less than a second predefined value (e.g., there may be delays of 0.5-10 s that are noticeable to the user or that may prevent events from being captured); an amount of the memory available to the program module may be less than a third predefined value (such as the minimum of amount of memory needed to execute the program module); and/or an amount of non-volatile storage available to the program module may be less than a fourth predefined value (such as the minimum of amount of non-volatile storage to store the content).

The program module may include features that allow monitoring electronic devices 110 and/or viewing electronic devices 112 to be repurposed to perform the preceding operations. For example, in the monitoring mode, the program module may disable one or more features of monitoring electronic devices 110 to conserve system resources, such as processor speed, memory, battery life, etc. Alternatively or additionally, monitoring electronic devices 110 may adjust an exposure time of one or more imaging sensors based on one of: a time of day, ambient lighting conditions and a quality metric for the images (such as signal-to-noise ratio).

As described further below with reference to FIGS. 7 and 8, when the program module determines that a power supply in a given monitoring electronic device (such as monitoring electronic device 110-1) provides power from an external power source (such as an AC power socket), the program module may ensure that monitoring electronic device 110-1 remains in the monitoring mode and does not transitions to a power-saving mode when monitoring electronic device 110-1 is inactive. For example, the program mode may disable a timer in monitoring electronic device 110-1 that is used to transition monitoring electronic device 110-1 to the power-saving mode. Alternatively, when the power supply provides power from an internal power source (such as a battery), the program module may selectively provide an activity signal that keeps monitoring electronic device 110-1 remains in the monitoring mode and does not transitions to a power-saving mode when monitoring electronic device 110-1 is inactive. This capability may ensure that monitoring electronic device 110-1 continues to monitor the environment and/or the external environment. (However, in some embodiments, when the power supply provides power from the internal power source, the program module may selectively allow, based on a configuration setting, monitoring electronic device 110-1 to transition to the power-saving mode when monitoring electronic device 110-1 is inactive and to transition back to the monitoring mode when the acoustic event occurs.)

Note that the program module may receive a proof-of-life request from another electronic device (such as one of viewing electronic devices 112) and may provide a response to the proof-of-life request. The response may indicate that monitoring electronic device 110-1 remains in the monitoring mode and has power. For example, an insurance carrier (that provides insurance coverage for the environment or one or more objects in the environment) may provide one or more requests (e.g., periodically, after a time interval, randomly and/or as needed) to confirm that monitoring electronic device 110-1 is monitoring the environment and/or the external environment.

Moreover, as noted previously, monitoring electronic devices 110 may be associated or paired with additional viewing electronic devices. In particular, users may register their monitoring electronic devices and viewing electronic devices with one or more controller electronic devices, such as controller electronic device 118. For example, the registration may occur when a user installs the program module on an electronic device. During registration, the user may define a minimal pairing or association, such as a designated monitoring electronic device and its associated viewing electronic device (e.g., monitoring electronic device 110-1 and viewing electronic device 112-1). Moreover, credentials, encryption keys and/or secure hash functions may be specified and/or exchanged between monitoring electronic device 110-1 and viewing electronic device 112-1 when the pairing or association is defined, and the credentials, the encryption keys and/or the secure hash functions may be specified or provided to controller electronic device 118. Alternatively or additionally, controller electronic device 118 may specify or provide the credentials, the encryption keys and/or the secure hash functions to monitoring electronic device 110-1 and viewing electronic device 112-1. In some embodiments, controller electronic device 118 generates the encryption keys for monitoring electronic device 110-1 and viewing electronic device 112-1.

As described further below with reference to FIGS. 9-11, subsequently controller electronic device 118 may keep track of the locations of monitoring electronic devices 110 as a function of time. For example, monitoring electronic device 110-1 may provide to controller electronic device 118 messages with times stamps and information that specifies the location of monitoring electronic device 110-1 (such as a GPS information or coordinates, cellular-telephone information, wireless-network information, etc.). These messages may be provided by monitoring electronic device 110-1 periodically, after a time interval at a fixed location and/or in response to a request from controller electronic device 118.

If controller electronic device 118 determines, based on the location information, that monitoring electronic device 110-1 is or is approximately at a fixed location (e.g., the location of monitoring electronic device 110-1 remains within 1-100 m of a previous location for at least 1-72 hours), controller electronic device 118 may associate viewing electronic device 112-1 with one or more additional monitoring electronic devices that are proximate to monitoring electronic device 110-1 (including providing or specifying credentials, encryption keys and/or secure hash functions). This may allow a user of viewing electronic device 112-1 to selectively access content acquired by the one or more additional monitoring electronic devices, such as images and/or acoustic information corresponding to sound in at least external environments that are proximate to the one or more additional monitoring electronic devices (and, if allowed during registration by users of the one or more additional monitoring electronic devices, images and/or acoustic information corresponding to sound in environments that include the one or more additional monitoring electronic devices). For example, the spatial extent of the associations may increase the longer monitoring electronic device 110-1 is at the fixed location. Thus, after a day viewing electronic device 112-1 may be associated with additional monitoring electronic devices of the nearest neighbors (or those that are within 50 m), after two days viewing electronic device 112-1 may be associated with additional monitoring electronic devices of second nearest neighbors (or those that are within 100 m), etc. Similarly, controller electronic device 118 may associate monitoring electronic device 110-1 with one or more additional viewing electronic devices that are already associated or paired with the one or more additional monitoring electronic devices, so that users of the one or more additional viewing electronic devices can selectively access content acquired by monitoring electronic device 110-1.

Furthermore, if monitoring electronic device 110-1 is moved from the fixed location (such as the location of monitoring electronic device 110-1 is more than 1-100 m from a previous location of monitoring electronic device 110-1), controller electronic device 118 may discontinue the associations with the one or more additional monitoring electronic devices.

This association technique may allow networks of electronic devices to be securely and dynamically assembled even when monitoring electronic device 110-1 and/or viewing electronic device 112-1 are outside of communication range (such as wireless communication range) with the one or more additional monitoring electronic devices.

Alternatively or additionally, as described further below with reference to FIGS. 12-14, networks of electronic devices may be securely and dynamically assembled based on the pattern of locations of viewing electronic device 112-1 as a function of time. In particular, viewing electronic device 112-1 may receive messages from another electronic device that executes an instance of the program module, such as one of monitoring electronic devices 110 (e.g., monitoring electronic device 110-2) or one of viewing electronic devices 112. These messages may advertise availability of content for an environment at a location associated with monitoring electronic device 110-2. In response, viewing electronic device 112-1 determines whether to request shared access to the content based on the location and locations of one or more of monitoring electronic devices 110 executing additional instances of the program module in a monitoring mode for which viewing electronic device 112-1 already has shared access. For example, the location may be different from the locations. Moreover, viewing electronic device 112-1 may determine whether to request shared access to the content based on a history of locations of viewing electronic device 112-1, which may indicate that viewing electronic device 112-1 was proximate to the location for more than: a predefined number of occasions (such as at least 2-10 times); and/or a predefined time duration (such as at least 5-60 min). Next, viewing electronic device 112-1 may provide a request for shared access to monitoring electronic device 110-2 based on the determination. Furthermore, viewing electronic device 112-1 may receive an acceptance message from monitoring electronic device 110-2 in response to the request, and viewing electronic device 112-1 may selectively accesses the content based on the acceptance message.

Similarly, once paired or associated, monitoring electronic device 110-1 (or another monitoring electronic device previously paired or associated with viewing electronic device 112-1) may share access to content it acquires with viewing electronic device 112-2.

Thus, viewing electronic device 112-1 may pair or associate with monitoring electronic device 110-2 based on regular proximity to the location of monitoring electronic device 110-2 (or, alternatively or additionally, of viewing electronic device 112-2). In particular, as the user moves around with viewing electronic device 112-1, their information network may be dynamically increased.

In these ways, monitoring electronic devices 110, viewing electronic devices 112, optional storage electronic device 116, and/or controller electronic device 118 may be used to: implement an information network that monitors the environments and/or the external environments; and/or aggregate and selectively disseminate content about events in the environments and/or the external environments.

Although we describe the environment shown in FIG. 1 as an example, in alternative embodiments, different numbers or types of electronic devices may be present. For example, some embodiments comprise more or fewer electronic devices.

We now further describe the environmental monitoring and the association techniques. FIG. 2 presents a flow diagram illustrating a method 200 for facilitating environmental monitoring, which may be performed by an electronic device (such as one of monitoring electronic devices 110 or one of viewing electronic devices 112 in FIG. 1). During operation, the electronic device sets an operating mode (operation 210) of the electronic device as a monitoring mode or a viewing mode. For example, the electronic device may execute a version of an operating system that is other than or different from a subsequent version of the operating system (i.e., an older version of the operating system). This may occur because the electronic device may be an older model and hardware limitations (such as an operating life of a power source, an execution speed of a program module, available memory when executing the subsequent version of the operating system, an amount of non-volatile storage available to the program module when executing the subsequent version of the operating system, etc.) may restrict its ability to execute the subsequent or newer version of the operating system.

When the electronic device is in the monitoring mode (operation 212), the electronic device at least selectively captures images and measures acoustic information (operation 214) corresponding to sound of an environment that includes the electronic device, and communicates the images and the acoustic information (operation 216) to a second electronic device (such as a paired or associated viewing electronic device or a storage electronic device). For example, the images may be captured and the acoustic information may be measured based on the occurrence of an event, such as an acoustic event. In particular, the acoustic event may include: insertion of a key into a lock; a sound exceeding a threshold level; a type of sound; and/or activation of acoustic sources in the environment having a predetermined phase relationship (such as a latency of sound associated with the acoustic sources). The electronic device may determine whether to capture the images and to measure the acoustic information based on the occurrence of the acoustic event and a history of acoustic events in the environment (e.g., by comparing the acoustic event with the history of acoustic events to determine if it is anomalous).

Alternatively or additionally, using hardware (such as a motion sensor) and/or software, the electronic device may detect motion in the environment, and the selective capturing of the images and measuring the acoustic information may be based on the detection of motion and a history of motion events in the environment (which may be used to determine if the detected motion is anomalous or unusual). For example, the electronic device may routinely capture images (such as every 10 s), and may detect motion based on differences between captured images. Then, when motion is detected, the electronic device may capture images more often (such as at a frame rate of an imaging sensor).

Note that the electronic device may use histories of events at one or more locations (i.e., from one or more monitoring electronic devices) when determining whether a particular event is anomalous or unusual (and, thus, worth of being presented to a user on an associated or paired viewing electronic device).

In some embodiments, the at least selectively capturing the images and measuring the acoustic information, and communicating the images and the acoustic information to the second electronic device may be based on an alert about an occurrence of an event in the environment (such as possible criminal activity, a natural disaster, an emergency, etc.) that is received from a governmental organization (such as a police department, a fire department, local government, e.g., a municipality, etc.) or an insurance carrier.

Note that, when the electronic device is in the monitoring mode, the electronic device may perform one or more optional operations (operation 218). For example, the electronic device may receive a proof-of-life request from the second electronic device, and may provide a response to the proof-of-life request. This response may indicate that the electronic device remains in the monitoring mode and has power.

Alternatively or additionally, when the electronic device is in the monitoring mode, the electronic device may disable one or more other functions of the electronic device. For example, functions other than those needed to perform the monitoring and to communicate the content may be disabled.

In some embodiments, when the electronic device is in the monitoring mode, the electronic device adjusts an exposure time of the imaging sensor based on: a time of day, ambient lighting conditions and/or a quality metric for the images. For example, the exposure time may be increased at times of day when there is less light, when the ambient lighting is below a threshold value (such as an illumination of less than 10-100 lux or lumens/$m^2$), and/or when a signal-to-noise ratio in the images is less than a second threshold value (such as 20-30 dB).

Alternatively, when the electronic device is in the viewing mode (operation 212), the electronic device at least selectively receives visual information (such as images, text, graphics, etc.) and additional acoustic information (operation 220) from the second electronic device, presents the visual information (operation 222) on the display, and outputs additional sound (operation 222) corresponding to the additional acoustic information using the acoustic transducer. Furthermore, when the electronic device is in the viewing mode, the electronic device may perform one or more optional operations (operation 224). For example, the electronic device may establish a peer-to-peer connection with the second electronic device.

In some embodiments, the second electronic device includes cloud-based storage for a third electronic device that monitors another environment (such as a data repository for the other environment that maintains a record of all events that occur in the other environment). Thus, when the electronic device is in the viewing mode, it may selectively access the visual information and the additional audio information from the cloud-based storage. Alternatively, when the electronic device is in the monitoring mode, it may provide the images and the acoustic information to the cloud-based storage, where it is subsequently selectively accessed by the third electronic device.

While the electronic device may selectively access content (such as images and/or audio information) for an environment based on events that occur in or proximate to the environment, in some embodiments the selective access is based on a location of the environment. For example, the electronic device may selectively access the content based on interests of a user. These interests may be predefined by the user (such as in a user profile) and/or may be based on user behaviors (such as web pages or websites visited by the user, search queries provided by the user, products purchased by the user, etc.). In some embodiments, the electronic device selectively access the content for the user (i.e., without an explicit request from the user). Thus, if the user is considering a vacation at the location, the electronic device may selectively access content from monitoring electronic devices at or proximate to the location. Alternatively or additionally, the user can access live streams via a network (such as the Internet), such as a web camera for Lake Tahoe or a volcano. Such web-camera access may be used as marketing lead information for travel services that market travel and lodging to or near a location that the user views repeatedly.

Figure 3:
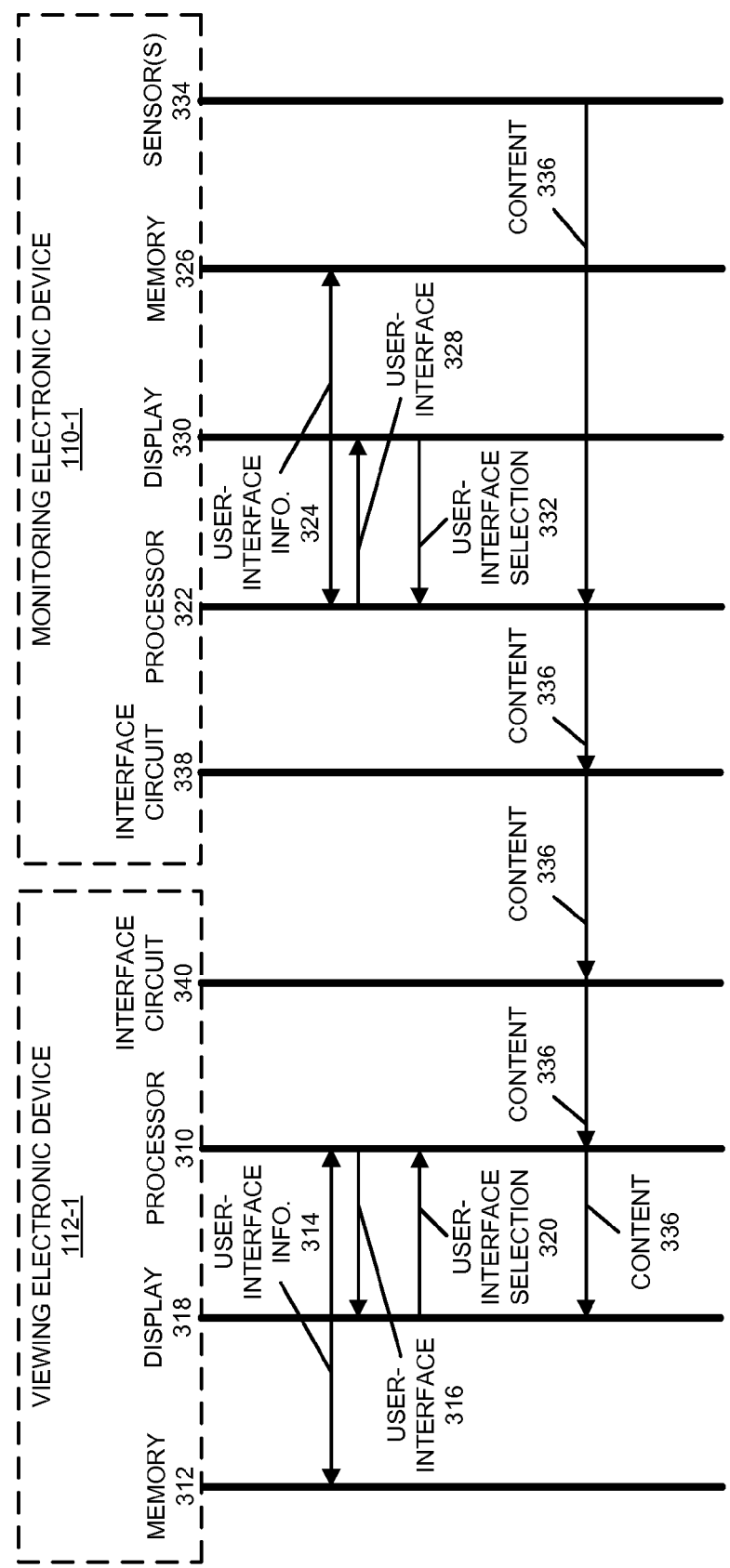
FIG. 3 is a drawing illustrating communication among at least some of the electronic devices of FIG. 1 in accordance with an embodiment of the present disclosure.

Embodiments of the communication technique are further illustrated in FIG. 3, which presents a drawing illustrating communication between monitoring electronic device 110-1 and viewing electronic device 112-1. In particular, processor 310 executing an instance of a program module in viewing electronic device 112-1 may display user interface 316 on display 318 based on user-interface information 314, which is accessed in memory 312. Moreover, processor 310 may receive a user-interface selection 320 (such as when the user clicks on or touches an icon in user interface 316) to select a particular operating mode of viewing electronic device 112-1 (i.e., the viewing mode). Similarly, processor 322 executing another instance of the program module in monitoring electronic device 110-1 may display user interface 328 on display 330 based on user-interface information 324, which is accessed in memory 326. Furthermore, processor 322 may receive a user-interface selection 332 (such as when the user clicks on or touches an icon in user interface 328) to select a particular operating mode of monitoring electronic device 110-1 (i.e., the monitoring mode). In some embodiments, either or both the operating modes are predefined, e.g., based on settings stored in memories 312 and 326.

Subsequently, sensor(s) 334 in monitoring electronic device 110-1 may capture content 336 (such as one or more images and/or audio information corresponding to sound). For example, content 336 may be captured when an event occurs, such as a loud sound or motion is detected. Alternatively or additionally, content 336 may be captured based on an alert or a notification received from a third party, such as an insurance carrier or a governmental organization. Sensor(s) 334 may provide content 336 to processor 322, which provides it to interface circuit 338. Then, interface circuit 338 may communicate content 336 to interface circuit 340, which provides it to processor 322. Next, processor 310 may present content 336 on display 310 and/or speakers (not shown).

In these ways, the environmental monitoring technique may allow electronic devices (including legacy electronic devices) to be dynamically repurposed for use in monitoring the environment and/or presenting images and/or audio information to users. Consequently, the improved functionality and services facilitated by the environmental monitoring technique may increase the use of the electronic devices (and, more generally, commercial activity) and may enhance customer satisfaction with the electronic device. Note that paired or associated electronic devices (such as a monitoring electronic device and a viewing electronic device) may reverse roles, thereby allowing two-way monitoring of different environments.

Figure 4:
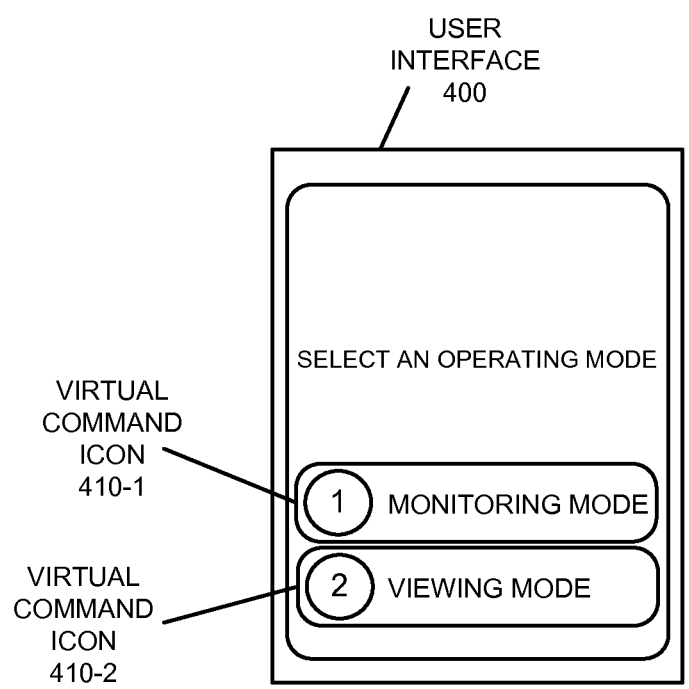
FIG. 4 is a drawing illustrating a user interface in an electronic device in FIG. 1 in accordance with an embodiment of the present disclosure.

As discussed previously, a user may select an operating mode of an electronic device using a user interface. This is shown in FIG. 4, which presents a drawing illustrating a user interface 400 in an electronic device in FIG. 1 (such as a user's cellular telephone). In particular, user interface 400 may be presented on a touch-sensitive display and may include virtual command icons 410 that correspond to the monitoring mode and the viewing mode. By contacting a surface of the touch-sensitive display within a virtual strike area of a given virtual command icon (such as virtual command icon 410-1) and/or subsequently breaking contact with the surface, the user may activate the given virtual command icon and, thus, may select one of the operating modes.

Note that user interface 400 may be generated by a program module executing on the electronic device based on user-interface information.

In some embodiments, the electronic device includes a rotatable base. This is illustrated in FIG. 5, which presents a drawing illustrating electronic device 500 (such as one of the electronic devices in FIG. 1). During the selective capture of the images and measurement of the acoustic information, rotatable base 510 may change an angular orientation 512 of electronic device 500 in the environment. For example, rotatable base 510 may rotate electronic device 500 about an axis 514 so that electronic device 500 tracks sound or a moving object in the environment. In this way, sensor(s), such as an imaging sensor, in electronic device 500 may keep an object of interest centered in its field of view.

Alternatively, a rotatable base 510 may rotate electronic device 500 about an axis 514 so that the electronic device 500 sweeps an area in response to a sound or detected motion (e.g., if the sound or motion is complicated or difficult to track, the rotatable base 510 can perform one or more sweeps with the field of view of a sensor, such as an imaging sensor in the electronic device 500, in order to have a better chance of capturing video of the source of the sound). Note that the sweep can be left and right, up or down, or any other suitable combination, can vary from −90° to +90°, and/or can be performed multiple times in response to a triggering event (such as motion or a sound above a threshold).

Additionally, the electronic device may include multiple imaging sensors with different fields of view, such as on opposite sides of the electronic device. This is illustrated in FIG. 6, which presents a drawing illustrating a top view of electronic device 500 (such as one of the electronic devices in FIG. 1) with imaging sensors 610. While selectively capturing the images, electronic device 500 may switch between imaging sensor 610-1 and imaging sensor 610-2 based on motion in the environment and the measured acoustic information. In this way, electronic device 500 may track an object of interest in the environment so one of imaging sensors 610 has the object in its field of view at a particular time.

In some embodiments, electronic device 500 includes an orientation sensor 612 (such as a compass, an accelerometer, etc.) that, during operation, determines an orientation of electronic device 500. Moreover, imaging sensor 610-1 may face an interior of a building or a room, while imaging sensor 610-2 may face an external environment (such as the exterior of the building or room). Note that images acquired using imaging sensor 610-1 may include sensitive or personal information about a user.

Consequently, electronic device 500 may use the determined orientation to identify images acquired or captured using imaging sensor 610-2, and may provide authorization to at least selectively access these images to one or more additional electronic devices, such as an electronic device executing an instance of the program module in the viewing mode. For example, the authorization may include credentials and/or an encryption key that facilitates the selective access. In some embodiments, the authorization is provided to one or more additional electronic devices that are paired or associated with electronic device 500. However, in other embodiments, the images captured by imaging sensor 610-2 are considered public and, therefore, may be shared with one or more additional electronic devices that are not associated or paired with electronic device 500. Thus, the user may be willing to share images acquired using imaging sensor 610-2 with arbitrary users (such as their neighbors), but may not be willing to share images acquired using imaging sensor 610-1 with these users. (In some embodiments the user is willing to share video acquired using imaging sensor 610-2, but is only willing to share still images acquired using imaging sensor 610-1.)

In this way, a virtual 'neighborhood watch' may be assembled to allow activities on a street or in a neighborhood to be monitored. For example, by combining the acquired content with the locations of monitoring electronic devices (such as GPS coordinates) in a neighborhood, it may be possible to track events in real time and/or after the fact.

In an exemplary embodiment, the program module is an application that can be used to retrofit an older cellular telephone and convert it into a security device that records video, detects loud noises, detects smoke-detector and carbon-monoxide alarms using the microphones, etc. For example, a user may use the application on their current cellular telephone in the viewing mode, and may use the application on their older cellular telephone in the monitoring mode (i.e., as a surveillance telephone). Moreover, updates to the older cellular telephone may no longer be supported by the manufacturer. Therefore, the older cellular telephone may be at end of life or at the end of a support contract, and this may not be able to upgrade to the latest version of the operating system. While such as older cellular telephone may not have the latest features or capabilities, it may retain limited functionality that can be harnessed or used by the application.

The user may select the monitoring mode and the various monitoring techniques (such as acoustic monitoring, video, etc.) on the older cellular telephone, and may specify communication to a cloud-based storage device and/or the user's current cellular telephone. Then, the user may mount the older cellular telephone in a window (such as using two-sided tape, a suction-cup mount, a magnetic mount, etc.). One camera in the older cellular telephone may face out towards the street and another camera in the older cellular telephone may face inside of the home. Images acquired using the outward facing camera may be shared with the public or a subset of all users (e.g., the other houses in the neighborhood). However, if a camera is facing inside of the house, the garage, or the backyard, a user may choose not to share those images with the public.

Note that the direction that a camera is facing can be determined using a compass. Moreover, the location of the older cellular telephone may be determined using GPS and/or a local positioning system (such as a positioning system associated with a wireless local area network). The location and the direction of a camera can be used specify a portion of a 'live street view' or a 'live neighborhood watch.' In turn, other users can use the location and the direction to identify content that augments or fills in holes in their 'map' of the neighborhood, and thus can be used to determine associations or pairings that would be beneficial to these users, so that they can request to associate or pair with these monitoring electronic devices.

As noted previously, in some embodiments the environmental monitoring is facilitated by: placing the older cellular telephone on a rotatable base; adding a fisheye (or wide-angle) lens over the built-in camera; and plugging the older cellular telephone into its charger. Note that the rotatable base may have a Bluetooth-controlled motor that allows the application and/or the user (e.g., remotely via their current cellular telephone) to pivot the older cellular telephone for additional viewing angles. For example, the rotatable based may facilitate a motion-detection sweep. In particular, when motion is detected, a motor in the rotatable base may swivel the older cellular telephone to scan or sweep the area one or more times using a spatial pattern (such as a 120° or 360° swivel), which may be specified or defined by the user. This capability may also allow the user to manually control orientation of the older cellular telephone from a remote location via their current cellular telephone.

The monitoring electronic device may provide real-time feeds that can use machine vision to track: pets, weather, cars, pedestrians, routines of individuals in a neighborhood (such as when neighbors get home), mail or product delivery, when trash or recycling is picked up, etc. Moreover, the history of these events may be used to classify an event and/or to determine if the event is unusual. For example, cars that drive by without abnormal acoustic sound (such as screeching tires or a blaring radio) may be deemed 'normal.' This capability may be used to filter the content, either locally (such as on the monitoring electronic device) and/or remotely (such as on the cloud-based storage system or the viewing electronic device).

In addition to selectively capturing the images and/or measuring the acoustic information, the older cellular telephone may report power outages, Internet outages, etc. Moreover, the older cellular telephone may communicate with other Bluetooth devices (such as a whistle dog collar), so that user can be informed if their pet dog or cat has escaped the range of the older cellular telephone (a so-called 'dog is out' alert).

In some embodiments, the content is stored on a cloud-based storage device, such as a server. For example, the content may be stored: on a per-event basis (which may allow users to pay for the storage service as they go), differentially (relative to previously stored content), during a time interval and/or continuously. Note that the content may be stored on the cloud-based storage device with user approval. Moreover, the content may be captured collaboratively (such as based on an alert from the police about possible criminal activity in a neighborhood) and/or the content may be reviewed collaboratively by a group of users that has shared access to the content to identify a subset of the content that is of interest. Alternatively or additionally, the content may be communicated from a monitoring electronic device to a viewing electronic device using email, a Short Message Service, etc. This may allow the monitoring electronic device to send pictures or video summaries (e.g., low-framerate video, low-resolution video, animation, photographs, etc.) to the viewing electronic device.

As noted previously, in addition to sharing content among associated or paired electronic devices, at least some of the content may be shared publically, such as with neighbors or with other interested parties. This may facilitate public views, such as of a beach, at a mountain, weather monitoring, etc. In this way, this subset of the content may be accessible and may be promoted in the application (e.g., conditions nearby, view all public monitoring electronic devices, etc.).

Figure 7:
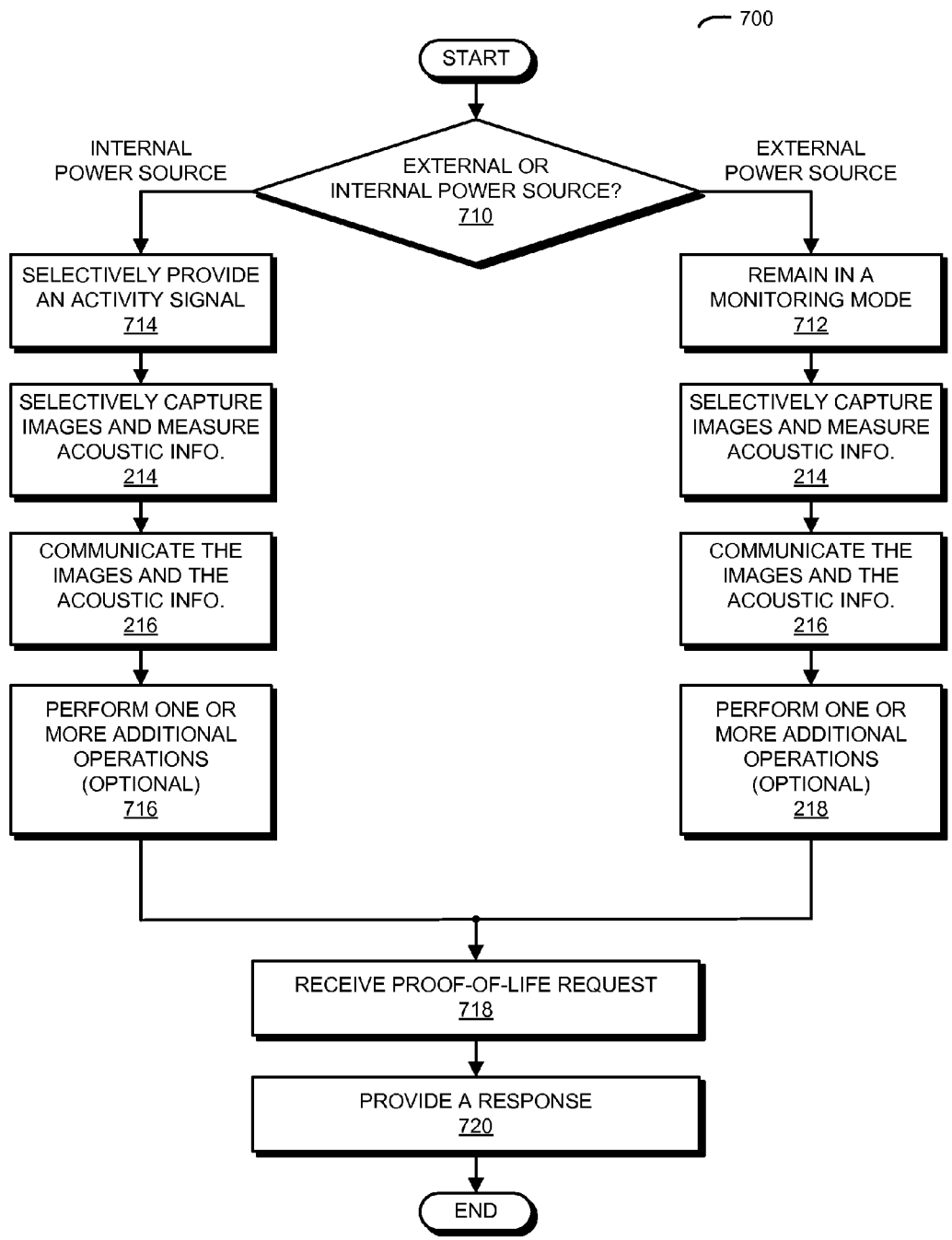
FIG. 7 is a flow diagram illustrating a method for facilitating environmental monitoring in FIG. 1 in accordance with an embodiment of the present disclosure.

FIG. 7 presents a flow diagram illustrating a method 700 for facilitating environmental monitoring in FIG. 1, which may be performed by an electronic device (such as one of monitoring electronic devices 110 in FIG. 1). During operation, the electronic device determines whether a power supply in the electronic device provides power from an external power source or an internal power source (such as a battery) (operation 710). When the power supply provides power from the external power source (operation 710), the electronic device remains in a monitoring mode (operation 712) without transitioning to a power-saving mode when the electronic device is inactive. In the monitoring mode, the electronic device at least selectively captures images and measures acoustic information corresponding to sound (operation 214) in an environment that includes the electronic device, and communicates the images and the acoustic information to a second electronic device (operation 216) (such as a paired or associated viewing electronic device or a storage electronic device). For example, the electronic device may remain in the monitoring mode without transitioning to the power-saving mode by disabling a timer in the electronic device that is used to transition the electronic device to the power-saving mode. (Alternatively or additionally, when the power supply provides power from the external power source, the electronic device may remain in the monitoring mode without transitioning to the power-saving mode by providing an activity signal that keeps the electronic device in the monitoring mode without transitioning to the power-saving mode when the electronic device is inactive.)

Furthermore, when the power supply provides power from the internal power source (operation 710), the electronic device selectively provides the activity signal (operation 714) that keeps the electronic device in the monitoring mode without transitioning to the power-saving mode when the electronic device is inactive. For example, the activity signal may be provided periodically, after a time interval (such as 1-5 min) and/or as needed. (Alternatively or additionally, when the power supply provides power from the internal power source, the electronic device may remain in the monitoring mode without transitioning to the power-saving mode by disabling the timer in the electronic device that is used to transition the electronic device to the power-saving mode.)

In some embodiments, when the power supply provides power from the internal power source (operation 710), the electronic device may optionally perform one or more additional operations (operation 716). For example, the electronic device may selectively allow, based on a configuration setting, the electronic device to transition to the power-saving mode when the electronic device is inactive and to transition back to the monitoring mode when the acoustic event occurs. This capability may allow the electronic device to transition to the power-saving mode during a power outage to conserve the internal power source. In particular, the electronic device may transition to the power-saving mode for image capture, but may maintain acoustic monitoring in an active mode so that acoustic events can still be detected and used to gate transitioning image capture back to the active mode so that images can be selectively captured.

Note that the electronic device may receive a proof-of-life request (operation 718) from the second electronic device and may provide a response (operation 720) to the proof-of-life request. The response may indicate that the electronic device remains in the monitoring mode and has power.

Figure 8:
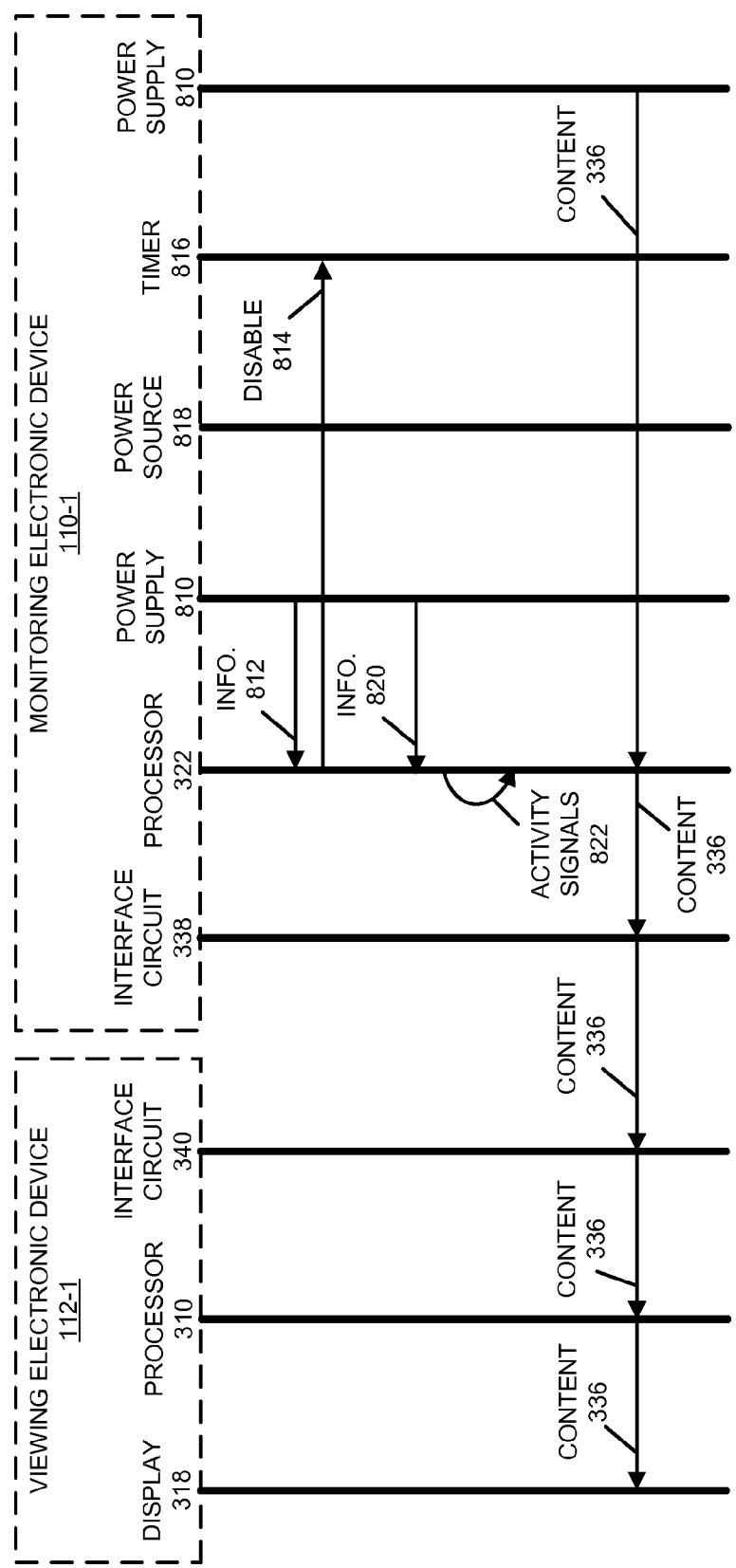
FIG. 8 is a drawing illustrating communication among at least some of the electronic devices of FIG. 1 in accordance with an embodiment of the present disclosure.

FIG. 8 presents a drawing illustrating communication among monitoring electronic device 110-1 and viewing electronic device 112-1. In particular, processor 322 executing an instance of a program module in monitoring mode may disable or restrict functions of monitoring electronic device 110-1. For example, when power supply 810 receives power from an external power source, power supply 810 may provide information 812 specifying this to processor 322. In response, processor 322 may disable 814 a timer 816 that is used to transition monitoring electronic device 110-1 to the power-saving mode when monitoring electronic device 110-1 is inactive. Alternatively, when power supply 810 receives power from internal power source 818 (such as a battery), power supply 810 may provide information 820 specifying this to processor 322. In response, processor 322 may one or more provide activity signals 822 that keep monitoring electronic device 110-1 in the monitoring mode without transitioning to the power-saving mode when monitoring electronic device 110-1 is inactive.

Subsequently, sensor(s) 334 in monitoring electronic device 110-1 may capture content 336 (such as one or more images and/or audio information corresponding to sound). For example, content 336 may be captured when an event occurs, such as a loud sound or motion is detected. Alternatively or additionally, content 336 may be captured based on an alert or a notification received from a third party, such as an insurance carrier or a governmental organization. Sensor(s) 334 may provide content 336 to processor 322, which provides it to interface circuit 338. Then, interface circuit 338 may communicate content 336 to interface circuit 340, which provides it to processor 310. Next, processor 310 may present content 336 on display 318 and/or speakers (not shown).

In these ways, the environmental monitoring technique may allow electronic devices (including legacy electronic devices) to provide continuous monitoring of the environment without transitioning to the power-saving mode. This may allow users to find new uses for older models of electronic devices and to obtain credit (for example, from insurance carriers) for the monitoring. Consequently, the improved functionality and services facilitated by the environmental monitoring technique may increase the use of the electronic devices (and, more generally, commercial activity) and may enhance customer satisfaction with the electronic device.

In an exemplary embodiment, an electronic device avoids transitioning to a power-saving mode even when the electronic device is inactive by disabling an idle timer and/or by providing activity signals (such as after a time interval, periodically, etc.). This capability may prevent the electronic device from going to sleep when it is publishing content (i.e., it is a monitoring electronic device) or subscribing or accessing content (i.e., it is a viewing electronic device). In some embodiments, the disabling of the idle timer or the providing of the activity signals may be restricted to these operations, because otherwise the battery or the internal power source in the electronic device may be drained too quickly.

Table 1 presents pseudo-code for use with an electronic device that uses an iOS operating system (from Apple, Inc., Cupertino, Calif.), and Table 2 presents pseudo-code for use with an electronic device that uses an Android operating system (from Alphabet, Inc., Mountain View, Calif.).

TABLE 1

/ In order to stop the app from going to sleep:
[UIApplication sharedApplication].idleTimerDisabled = YES;
/ This will disable the idle timer and stop the electronic device from automatically going into sleep mode.
/ In order to re-allow the phone to go into sleep mode use the following:
[UIApplication sharedApplication].idleTimerDisabled = NO;
/ This will re-enable the idle timer and the phone can go back to sleep
/ In order to disable stand-by mode:
[[UIApplication sharedApplication] setIdleTimerDisabled:YES];
/In order to enable stand-by mode:
[[UIApplication sharedApplication] setIdleTimerDisabled:NO];

TABLE 2

/ Wake_Lock provides the ability for an application to control the power state of the electronic device. In order to utilize the Wake_Lock capabilities the Wake_Lock permission must be added to the manifest file of the application:
<uses-permission android:name="android.permission.WAKE_LOCK" />
/ In order to remove/release the Wake_Lock capability:
wakelock.release( ).
/ In order to keep the screen on:
getWindow( ).addFlags(WindowManager.LayoutParams.FLAG_KEEP_SCREEN_ON);
/ In order to allow the screen to turn off again:
getWindow( ).clearFlags(WindowManager.LayoutParams.FLAG_KEEP_SCREEN_ON);

In some embodiments, when the application is turned on, standby mode is disabled so the monitoring electronic device does not lock and sleep mode is disabled so the screen or display does not turn off. (Note that, because sleep mode can disable the application functionality until the electronic device is awakened or unlocked, it may be useful to disable sleep mode or automatic locking modes on the electronic device.) Then, while the application is running or executing, if the monitoring electronic device is unplugged from an external power source, the screen may be dimmed to the lowest possible setting to conserve power and/or the sleep mode may be re-enabled.

Moreover, when the application is turned on and running or executing, a series of subroutines may execute. In particular, if no motion is detected for a period of time, a face-recognition technique does not identify anyone for a second period of time and/or the monitoring electronic device is unplugged from an external power source, then the screen may be dimmed to the lowest possible setting to conserve power and/or the sleep mode may be re-enabled. Alternatively or additionally, if video conferencing between paired electronic devices has concluded, then the screen may be dimmed to the lowest possible setting to conserve power and/or the sleep mode may be re-enabled. Furthermore, if a sound is detected in the environment or video conferencing between paired electronic devices has begun, the screen may be turned on, sleep mode may be disabled, and/or standby mode may be disabled.

Additionally, when the application is running, if no motion is detected, no action may be taken. However, if motion is detected, a face-recognition technique may be used to determine if a familiar or known face is detected. If yes, the user of the viewing electronic device may be notified about who has entered the environment. Alternatively, if a familiar face is not detected, the user of the viewing electronic device may be notified that motion was detected in the environment. Moreover, the monitoring electronic device may be panned or scanned from an initial position over a counterclockwise arc of 180°, and then may be panned or scanned from the initial position over a clockwise arc of 180°. Afterwards, the monitoring electronic device may be restored to the initial position. Furthermore, the captured video may be saved or stored on the monitoring electronic device, and then may be communicated to the user of the viewing electronic device (e.g., using email).

Note that for monitoring electronic devices that support simultaneous video capture from the front and back cameras, the application may stream both videos concurrently if the user selects both as inputs. Alternatively, if motion is detected using one of the cameras, streaming video from both cameras may be enabled. This feature may be used when the monitoring electronic device is placed in a dock and/or when the dock pans or scans the camera(s) by rotating about an axis.

However, for monitoring electronic devices that do not support simultaneous video capture from the front and back cameras, a multiplexing technique (or one or more in a set of multiplexing techniques) may be used. For example, every other frame of video may be captured with a particular camera (such as a first frame from the front camera, then a second frame from the back camera, etc.). Alternatively, every N frames of video may be captured with a particular camera (such as ten frames from the front camera, then ten frames from the back camera, etc.). In some embodiments, M frames of video may be captured with one camera, and the N frames of video may be captured with the other camera, where M is less than N. Thus, five frames may be captured from the front camera, then ten frames may be captured from the back camera, etc. This multiplexing technique may be useful when one camera has a higher frame rate than the other (in which case, the higher frame-rate camera may be used to capture the M frames).

Figure 9:
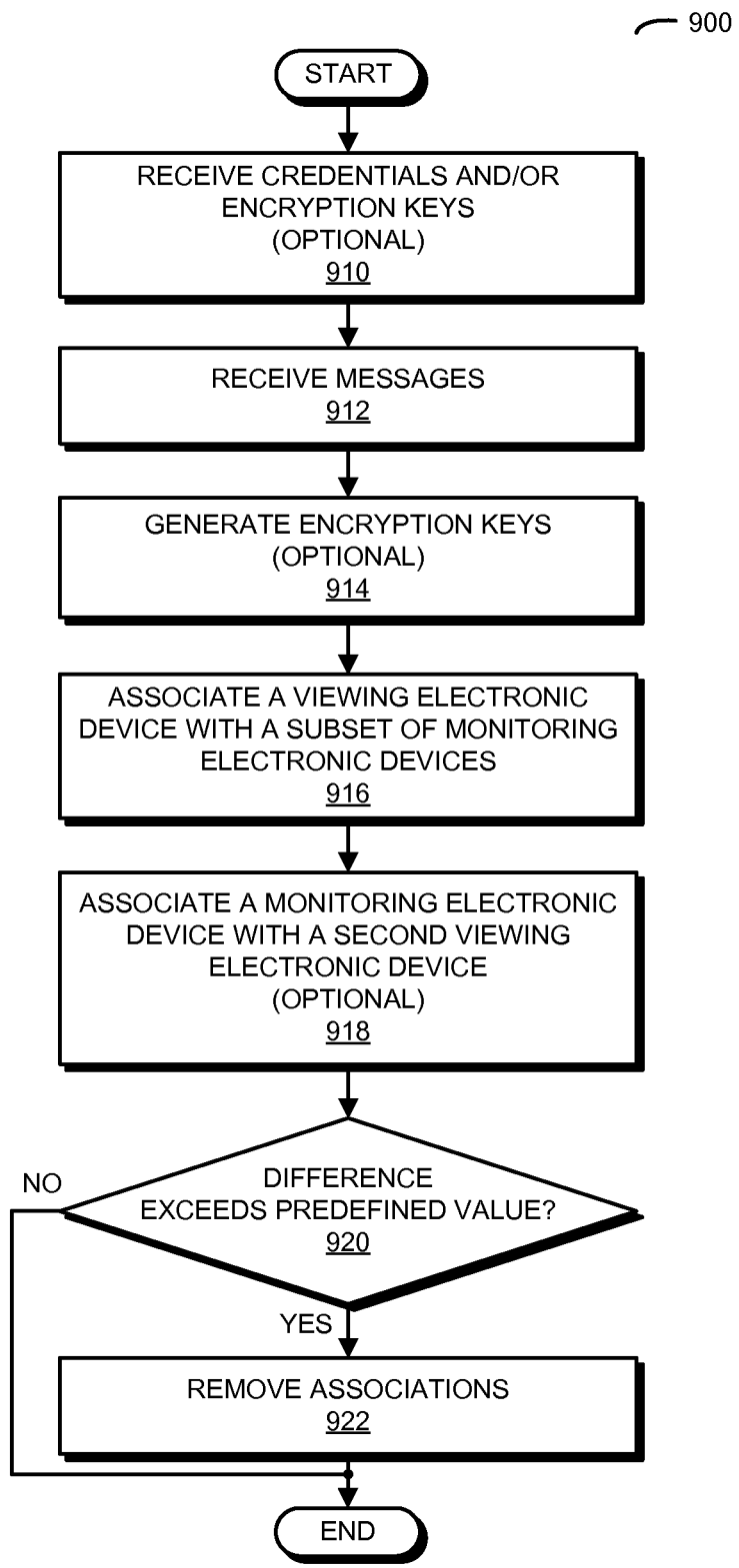
FIG. 9 is a flow diagram illustrating a method for facilitating environmental monitoring in FIG. 1 in accordance with an embodiment of the present disclosure.

FIG. 9 presents a flow diagram illustrating a method 900 for facilitating environmental monitoring in FIG. 1, which may be performed by a controller electronic device (such as controller electronic device 118 in FIG. 1). During operation, the controller electronic device receives messages (operation 912) that include timestamps and current locations of a monitoring electronic device. For example, monitoring electronic device may periodically or after a time interval transmit the messages (which function as beacons).

Then, the controller electronic device associates a viewing electronic device (which is paired with or associated with the monitoring electronic device) with a subset of second monitoring electronic devices (operation 916) based on a duration of time that the monitoring electronic device is approximately at a fixed location (such as within 1-100 m of a previous location for at least 1-72 hours). Note that a size of the subset increases as the duration of time increases, and the associations allow the viewing electronic device to selectively access content, including acoustic information and images for second environments that include the subset of the second monitoring electronic devices, from the subset of the second monitoring electronic devices. For example, the subset of the second monitoring electronic devices may be located within a distance from the fixed location, and the distance may increase as the duration of time increases. Thus, after a day, the electronic device may be associated with the subset of the second monitoring electronic devices those that are within 50 m, after two days, the electronic device may be associated with the subset of the second monitoring electronic devices that are within 100 m, etc. Alternatively or additionally, the subset of the second monitoring electronic devices may be located within an adjacency value from the fixed location (such as nearest neighbors, next-nearest neighbors, etc.), and the adjacency value may increase as the duration of time increases.

In some embodiments, the controller electronic device optionally receives credentials (such as a username, a password and/or an identifier) (operation 910) from the viewing electronic device and the subset of the second monitoring electronic devices, and associating the viewing electronic device and the subset of the second monitoring electronic devices (operation 916) may involve providing the credentials to the viewing electronic device and the subset of the second monitoring electronic devices. Additionally, the controller electronic device may optionally receive encryption keys (operation 910) from the viewing electronic device and the subset of the second monitoring electronic devices, and associating the viewing electronic device and the subset of the second monitoring electronic devices (operation 916) may involve providing the encryption keys to the viewing electronic device and the subset of the second monitoring electronic devices. In some embodiments, the controller electronic device optionally generates the encryption keys (operation 914) for the viewing electronic device and the subset of the second monitoring electronic devices, and associating the viewing electronic device and the subset of the second monitoring electronic devices (operation 916) may involve providing the encryption keys to the viewing electronic device and the subset of the second monitoring electronic devices. Note that, in general, the credentials and the encryption keys may be used by viewing electronic devices to selectively access content, such as from a monitoring electronic device and/or from a cloud-based storage device.

Moreover, the controller electronic device may optionally associate the monitoring electronic device with a second viewing electronic device (operation 918) that is associated with one of the second monitoring electronic devices. The association between the monitoring electronic device with the second viewing electronic device may allow the second viewing electronic device to selectively access content, including images and acoustic information corresponding to sound, for the environment. Furthermore, the controller electronic device may optionally receive credentials (operation 910) from the monitoring electronic device and the second viewing electronic device, and associating the monitoring electronic device and the second viewing electronic device (operation 918) may involve providing the credentials to the monitoring electronic device and the second viewing electronic device. Additionally, the controller electronic device may optionally receive encryption keys (operation 910) from the monitoring electronic device and the second viewing electronic device, and associating the monitoring electronic device and the second viewing electronic device (operation 918) may involve providing the encryption keys to the monitoring electronic device and the second viewing electronic device. In some embodiments, the controller electronic device optionally generates the encryption keys (operation 914) for the monitoring electronic device and the second viewing electronic devices, and associating the monitoring electronic device and the second viewing electronic device involves providing the encryption keys (operation 918) to the monitoring electronic device and the second viewing electronic device.

Furthermore, when a difference between a current location of the monitoring electronic device and the fixed location exceeds a predefined value (operation 920), the controller electronic device removes the associations (operation 922).

By receiving the messages and associating the viewing electronic device with the subset of the second monitoring electronic devices, the controller electronic device may establish selective access to the content when the viewing electronic device is outside of communication range with the subset of the monitoring electronic devices. For example, this association technique may allow the viewing electronic device to selectively access content even when the viewing electronic device is outside of direct, wireless communication range with the subset of the monitoring electronic devices.

Figure 10:
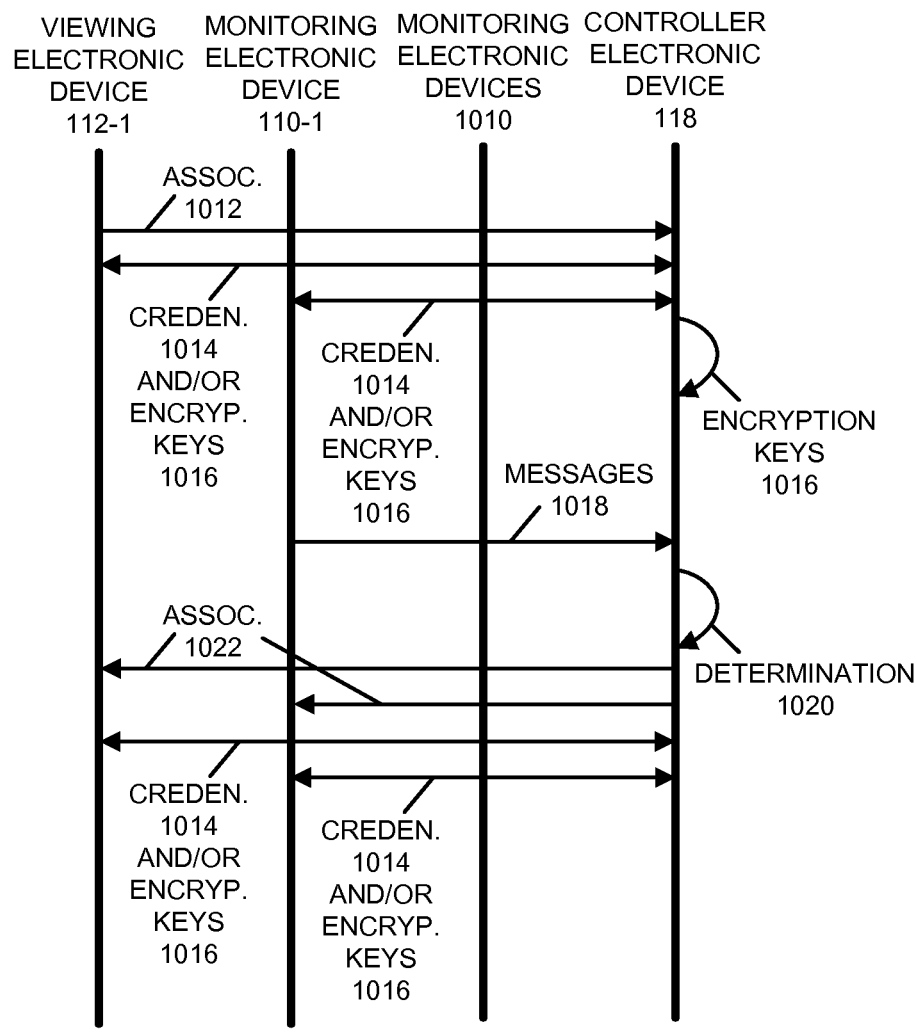
FIG. 10 is a drawing illustrating communication among at least some of the electronic devices of FIG. 1 in accordance with an embodiment of the present disclosure.

FIG. 10 presents a drawing illustrating communication among monitoring electronic device 110-1, monitoring electronic devices 1010, viewing electronic device 112-1 and controller electronic device 118. In particular, a user of viewing electronic device 112-1 may set up or define an association 1012 (or pairing) in controller electronic device 118 between monitoring electronic device 110-1 and viewing electronic device 112-1. Note that controller electronic device 118 may confirm the association based on a predefined list of electronic devices associated with or used by the user. When the association is defined, credentials 1014 and/or encryption keys 1016 may be exchanged between controller electronic device 118, monitoring electronic device 110-1 and viewing electronic device 112-1. In some embodiments, controller electronic device 118 generates encryption keys 1016.

Subsequently, monitoring electronic device 110-1 may provide messages 1018 with timestamps and locations of monitoring electronic device 110-1. If controller electronic device 118 determines 1020 that monitoring electronic device 110-1 has remained at location for a time interval, controller electronic device 118 may define associations 1022 between viewing electronic device 112-1 and a subset of monitoring electronic devices 1010 (which are at locations other than the location). This may optionally include providing messages to viewing electronic device 112-1 and the subset of monitoring electronic devices 1010 informing these electronic devices of the association or pairing. When the associations are defined, credentials 1014 and/or encryption keys 1016 may be exchanged between controller electronic device 118, the subset of monitoring electronic devices 1010 and viewing electronic device 112-1. Moreover, as the time interval monitoring electronic device 110-1 remains at the location increases, the spatial extent of the subset of monitoring electronic devices 1010 may increase.

In this way, over time viewing electronic device 112-1 may be able to selectively access content (such as images and/or audio information) from an ever increasing number of monitoring electronic devices having an ever increasing spatial extent. However, if controller electronic device 118 determines that monitoring electronic device 110-1 is no longer at location 1020, controller electronic device 118 may discontinue 1020 associations 1022 between viewing electronic device 112-1 and the subset of monitoring electronic devices 1010 (but the association between monitoring electronic device 110-1 and viewing electronic device 112-1 may be maintained).

Figure 11:
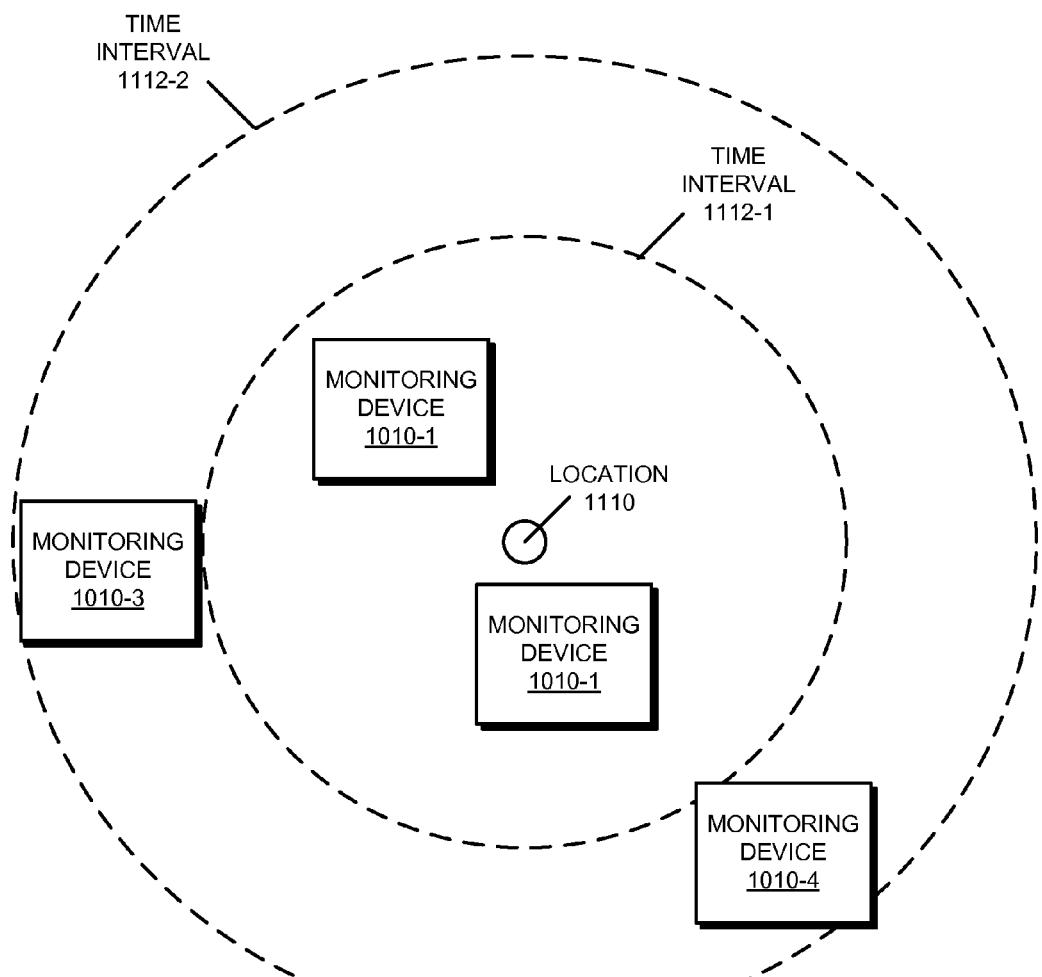
FIG. 11 is a drawing illustrating association of at least some of the electronic devices of FIG. 1 in accordance with an embodiment of the present disclosure.

The dynamic associations are shown in FIG. 11, which presents a drawing illustrating association of viewing electronic device 112-1 and monitoring electronic devices 1010 as a function of time. In particular, if monitoring electronic device 110-1 remains at location 1110 for time interval 1112-1, viewing electronic device 112-1 may be associated with monitoring electronic devices 1010-1 and 1010-2. For example, if monitoring electronic device 110-1 remains within 10 m of location 1110 for 12 hours, viewing electronic device 112-1 may be associated with monitoring electronic devices 1010-1 and 1010-2 (which are within 50 m of location 1110). Alternatively, after 12 hours the associations may include nearest neighbors of monitoring electronic device 110-1, and after the associations may include nearest neighbors and next-nearest neighbors of monitoring electronic device 110-1.

Then, if monitoring electronic device 110-1 remains at location 1110 for time interval 1112-2, viewing electronic device 112-1 may be associated with monitoring electronic devices 1010-1, 1010-2, 1010-3 and 1010-4. For example, if monitoring electronic device 110-1 remains within 10 m of location 1110 for 24 hours, viewing electronic device 112-1 may be associated with monitoring electronic devices 1010-1 and 1010-2 (which are within 50 m of location 1110) and monitoring electronic devices 1010-3 and 1010-4 (which are within 50 m of location 1110).

Thus, the size of the subset may increase as the duration of the time interval increases, and the associations may allow viewing electronic device 112-1 to selectively access content from the subset of monitoring electronic devices 1010 (including acoustic information corresponding to sound and images for environments that include the subset of monitoring electronic devices 1010). Consequently, the longer a cellular telephone executing the program module in the monitoring mode is at a particular location and active, the wider the information network that is shared with the user of this cellular telephone. In an exemplary embodiment, after a day the user can selectively access content from their neighbors, after a week the user can selectively access content from their entire neighborhood, and after a year the user can selectively access content from their entire town. Furthermore, when the cellular telephone is moved (such as more than 1-100 m), the associations may reset.

This dynamic-association feature may prevent or make it more difficult for someone briefly visiting a neighborhood in an attempt to establish associations or pairings for illicit purposes. Instead, a user may be rewarded with an ever-expanded information network based on stability of the geolocation of their monitoring electronic device and/or their viewing electronic device. Moreover, by using one or more controller electronic devices to facilitate the dynamic associations, this association technique may provide a low-friction (i.e., low user effort) approach for building an information network for a user, and such a low-friction approach can make it easier for a user to use and enjoy the information network.

Figure 12:
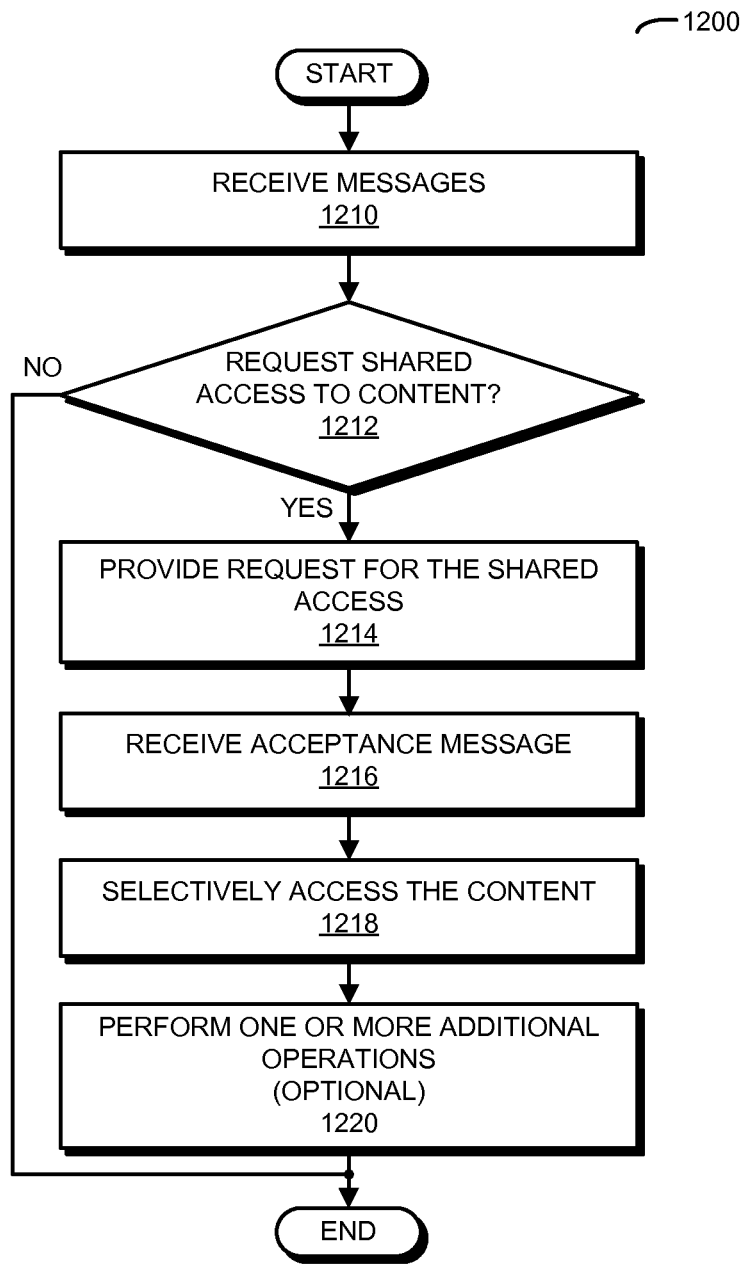
FIG. 12 is a flow diagram illustrating a method for facilitating environmental monitoring in FIG. 1 in accordance with an embodiment of the present disclosure.

FIG. 12 presents a flow diagram illustrating a method 1200 for facilitating environmental monitoring in FIG. 1, which may be performed by an electronic device (such as one of viewing electronic devices 112 in FIG. 1). During operation, the electronic device (which may execute an instance of a program module in a viewing mode, and thus may be referred to as a 'viewing electronic device') receives messages (operation 1210) from a second electronic device executing another instance of the program module. These messages advertise availability of content for an environment at a location associated with the second electronic device (e.g., the messages may indicate that the second electronic device is executing the other instance of the program module), and the content includes images of the environment and acoustic information corresponding to sound in the environment. For example, the environment may include the second electronic device and the second electronic device may execute the instance of the program module in a monitoring mode (and thus may be referred to as a 'monitoring electronic device') to collect the content. Alternatively, the second electronic device may execute an instance of the program module in the viewing mode and the content may be collected by a monitoring electronic device at the location that executes an instance of the program module in the monitoring mode, and which is paired or associated with the second electronic device.

Then, the electronic device determines whether to request shared access to the content (operation 1212) based on the location and locations of one or more monitoring electronic devices executing additional instances of the program module in a monitoring mode for which the electronic device already has shared access. For example, the location may be different than any of the locations. Moreover, the determination may be based on a history of locations of the electronic device. In particular, the history of the locations may indicate that the electronic device was proximate to the location for more than: a predefined number of occasions (such as at least 2-10 times); and/or a predefined time duration (such as at least 5-60 min).

Next, the electronic device provides, to the second electronic device, a request for shared access (operation 1214) based on the determination. Furthermore, the electronic device receives an acceptance message (operation 1216) from the second electronic device in response to the request, and the electronic device selectively accesses the content (operation 1218) based on the acceptance message. For example, the acceptance message may include credentials and/or an encryption key that facilitate the selective access.

In some embodiments, the electronic device optionally performs one or more additional operations (operation 1220). For example, while in the viewing mode, the electronic device may selectively access second content for a second environment at one of the locations that is collected by a monitoring electronic device executing an instance of the program module in the monitoring mode and that is associated or paired with the electronic device. Note that the second content may include images of the second environment and acoustic information corresponding to sound in the second environment. Moreover, the electronic device may provide, to the second electronic device, access to the second content in response to the acceptance message. Note that providing access to the second content may involve providing, to the second electronic device, credentials and/or an encryption key that facilitate the selective access.

By providing the request and receiving the acceptance message, the electronic device may establish selective access to the content when the electronic device is outside of communication range with the monitoring electronic device at the location. For example, the electronic device may establish selective access to the content when the electronic device is outside of direct, wireless communication range with the monitoring electronic device at the location. Moreover, the instances of the program module executed by the electronic device and the second electronic device may help authenticate or facilitate recognition of suitable electronic devices with which to associate.

In some embodiments of methods 200 (FIG. 2), 700 (FIG. 7), 900 (FIG. 9) and/or 1200 (FIG. 12) there may be additional or fewer operations. Moreover, the order of the operations may be changed, and/or two or more operations may be combined into a single operation.

Figure 13:
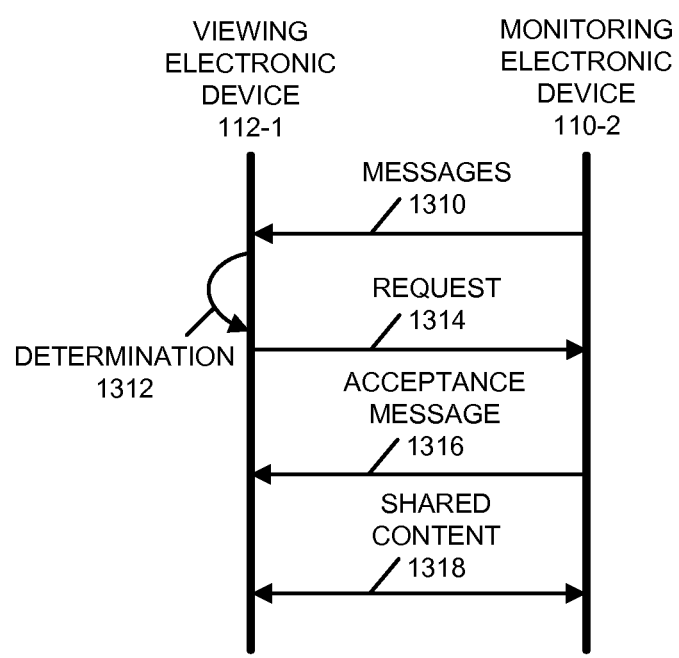
FIG. 13 is a drawing illustrating communication among at least some of the electronic devices of FIG. 1 in accordance with an embodiment of the present disclosure.

FIG. 13 presents a drawing illustrating communication among viewing electronic device 110-1 and monitoring electronic device 110-2. In particular, viewing electronic device 110-1 may receive one or more messages 1310 from monitoring electronic device 110-2. These messages may advertise the availability of content 1318 for an environment at a location associated with monitoring electronic device 110-2. In response, viewing electronic device 110-1 may determine 1312 whether to request shared access to content 1318.

Based on determination 1312, viewing electronic device 110-1 may request 1314 shared access to content 1318. In response, monitoring electronic device 110-2 may provide an acceptance message 1316. This acceptance message may include credentials and/or an encryption key that facilitates the shared access to content 1318. Next, viewing electronic device 110-1 may selectively access content 1318.

In this way, viewing electronic device 112-1 may be able to selectively access content (such as images and/or audio information) from monitoring electronic devices that are of interest to a user of viewing electronic device 112-1, e.g., based on the history of locations of viewing electronic device 112-1 and, in particular, how often and how long viewing electronic device 112-1 is at or proximate to the location of monitoring electronic device 110-2.

Figure 14:
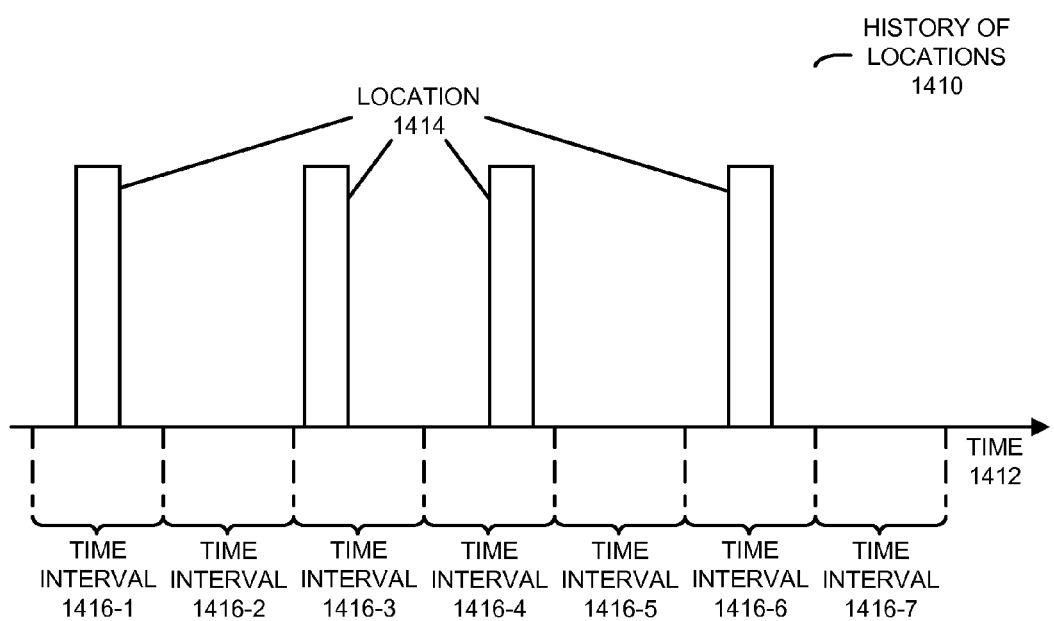
FIG. 14 is a drawing illustrating requesting shared access to content between at least some of the electronic devices of FIG. 1 in accordance with an embodiment of the present disclosure.

This association technique is further shown in FIG. 14, which presents a drawing illustrating requesting shared access to content between viewing electronic device 110-1 and monitoring electronic device 110-2. In particular, history of locations 1410 of viewing electronic device 110-1 as a function of time 1412 shows that viewing electronic device 110-1 repeatedly visits location 1414 of monitoring electronic device 110-2 and that the duration or sum of time intervals 1416 during which viewing electronic device 110-1 is proximate to location 1414 exceeds a predefined value. For example, viewing electronic device 110-1 may be at or proximate to location 1414 at least 2-10 times and/or may have a predefined time duration at or proximate to location 1414 of at least 5-60 min. When either or both of these criteria are achieved, viewing electronic device 110-1 may request to associate or pair with monitoring electronic device 110-2 so that it can selectively access the content. This approach may help ensure that there are only associations that are of interest to the user of viewing electronic device 110-1. It may also allow the user to auto-complete an emergency list or a contact list based on their activities (such as the locations they visit), which may indicate the individuals that are most important to them.

We now describe embodiments of an electronic device. FIG. 15 presents a block diagram illustrating an electronic device 1500, such as one of monitoring electronic devices 110, one of viewing electronic devices 112, optional access point 114, optional storage electronic device 116 or controller electronic device 118 in FIG. 1. (In the discussion that follows, the functionality of one of monitoring electronic devices 110 or one of viewing electronic devices 112 is used as an illustration. Other electronic devices, such as controller electronic device 118, may have a subset of this functionality.) This electronic device includes processing subsystem 1510 (and, more generally, an integrated circuit or a control mechanism), memory subsystem 1512, networking subsystem 1514, power subsystem 1516, optional sensor subsystem 1520 (i.e., a data-collection subsystem and, more generally, a sensor mechanism) and optional sensory-output subsystem 1534. Processing subsystem 1510 includes one or more devices configured to perform computational operations (such as executing techniques to process captured images, measured acoustic information and, more generally, sensor data). For example, processing subsystem 1510 can include one or more microprocessors, application-specific integrated circuits (ASICs), microcontrollers, programmable-logic devices, and/or one or more digital signal processors (DSPs).

Memory subsystem 1512 includes one or more devices for storing data and/or instructions for processing subsystem 1510, networking subsystem 1514 and/or optional sensor subsystem 1520. For example, memory subsystem 1512 can include dynamic random access memory (DRAM), static random access memory (SRAM), and/or other types of memory. In some embodiments, instructions for processing subsystem 1510 in memory subsystem 1512 include: one or more program modules or sets of instructions (such as one or more program modules 1528), which may be executed in an operating environment (such as operating system 1530) by processing subsystem 1510. While the one or more program modules 1528 executed by processing subsystem 1510 may be resident on electronic device 1500 (such as stand-alone applications or portions of one or more other applications that are resident on and which execute on electronic device 1500), in some embodiments a given one of the one or more program modules 1528 may be embedded in a web page that is provided by a remote server or computer via a network, and which is rendered by a web browser on electronic device 1500. For example, at least a portion of the given program module may be an application tool that is embedded in the web page, and which executes in a virtual environment of the web browser. Thus, the application tool may be provided to electronic device 1500 via a client-server architecture. Note that the one or more computer programs may constitute a computer-program mechanism. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Networking subsystem 1514 includes one or more devices configured to couple to and communicate on a wired and/or wireless network (i.e., to perform network operations and, more generally, communication), including: interface circuit 1524 and one or more associated antennas 1526. (While FIG. 15 includes one or more antennas 1526, in some embodiments electronic device 1500 includes one or more nodes on interface circuit 1524, e.g., pads, which can be coupled to one or more antennas 1526. Thus, electronic device 1500 may or may not include one or more antennas 1526.) For example, networking subsystem 1514 can include: a ZigBee® networking subsystem, a Bluetooth networking system (such as Bluetooth Low Energy), a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, an infra-red communication system, a power-line communication system and/or another communication system (such as a near-field-communication system or an ad-hoc-network networking system). Note that the combination of interface circuit 1524 and at least one of one or more antennas 1526 may constitute a radio.

Moreover, networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. In some embodiments, a 'network' between the electronic devices does not yet exist. Therefore, electronic device 1500 may use the mechanisms in networking subsystem 1514 for performing simple wireless communication between the electronic devices, e.g., transmitting advertising or beacon frames and/or scanning for advertising frames transmitted by other electronic devices.

Furthermore, electronic device 1500 may include power subsystem 1516 with one or more power sources 1518. Each of these power sources may include: a battery (such as a rechargeable or a non-rechargeable battery), a DC power supply, a transformer, and/or a switched-mode power supply. Moreover, the one or more power sources 1518 may operate in a voltage-limited mode or a current-limited mode. Furthermore, these power sources may be mechanically and electrically coupled by a male or female adaptor to: a wall or electrical-outlet socket or plug (such as a two or three-pronged electrical-outlet plug, which may be collapsible or retractable), a light socket (or light-bulb socket), electrical wiring (such as a multi-wire electrical terminal), a generator, a USB port or connector, a DC-power plug or socket, a cellular-telephone charger cable, a photodiode, a photovoltaic cell, etc. This mechanical and electrical coupling may be rigid or may be remateable. Note that the one or more power sources 1518 may be mechanically and electrically coupled to an external power source or another electronic device.

Additionally, optional sensor subsystem 1520 may include one or more sensor devices 1522 (or a sensor array), which may include one or more processors and memory. For example, the one or more sensor devices 1522 may include: a thermal sensor (such as a thermometer), a humidity sensor, a barometer, a camera or video recorder (such as a CCD or CMOS imaging sensor), a flash or an optical or infra-red light source, one or more microphones or acoustic transducers (which may be able to record sound, including acoustic information in a band of frequencies, in mono or stereo), a load-monitoring sensor or an electrical-characteristic detector (and, more generally, a sensor that monitors one or more electrical characteristics), an infrared sensor (which may be active or passive), a microscope, a particle detector (such as a detector of dander, pollen, dust, exhaust, etc.), an air-quality sensor, a particle sensor, an optical particle sensor, an ionization particle sensor, a smoke detector (such as an optical smoke detector or an ionizing smoke detector), a fire-detection sensor, a radon detector, a carbon-monoxide detector, a chemical sensor or detector, a volatile-organic-compound sensor, a combustible gas sensor, a chemical-analysis device, a mass spectrometer, a microanalysis device, a nano-plasmonic sensor, a genetic sensor (such as a micro-array), an accelerometer, a position or a location sensor (such as a location sensor based on GPS), a gyroscope, a motion sensor (such as a light-beam sensor), a contact sensor, a strain sensor (such as a strain gauge), a proximity sensor, a microwave/radar sensor (which may be active or passive), an ultrasound sensor, a vibration sensor, a fluid flow sensor, a photo-detector, a Geiger counter, a radio-frequency radiation detector, and/or another device that measures a physical effect or that characterizes an environmental factor or physical phenomenon (either directly or indirectly). Note that the one or more sensor devices 1522 may include redundancy (such as multiple instances of a type of sensor device) to address sensor failure or erroneous readings, to provide improved accuracy and/or to provide improved precision.

Moreover, optional sensory-output subsystem 1534 may include one or more output devices 1536, such as a display and/or one or more speakers (or acoustic transducers). One or more output devices 1536 may be used to display images and/or to output sound.

During operation of electronic device 1500, processing subsystem 1510 may execute one or more program modules 1528, such as an environmental-monitoring application to perform the environmental monitoring technique and/or the association technique. For example, the one or more program modules 1528 may use one or more sensor devices 1522 to monitor one or more environmental conditions in an environment that includes electronic device 1500. The resulting sensor data (or content) may be shared with one or more other electronic devices (such as another electronic device executing instances of the one or more program modules 1528) via networking subsystem 2014.

Within electronic device 1500, processing subsystem 1510, memory subsystem 1512, networking subsystem 1514, power subsystem 1516, optional sensor subsystem

1520 and/or optional sensory-output subsystem 1534 may be coupled using one or more interconnects, such as bus 1532. These interconnects may include an electrical, optical, and/or electro-optical connection that the subsystems can use to communicate commands and data among one another. Although only one bus 1532 is shown for clarity, different embodiments can include a different number or configuration of electrical, optical, and/or electro-optical connections among the subsystems.

Electronic device 1500 can be (or can be included in) a wide variety of electronic devices, such as an electronic device with at least one network interface. For example, electronic device 1500 can be (or can be included in): a sensor (such as a smart sensor), a tablet computer, a smartphone or a cellular telephone, an appliance, a regulator device, a consumer-electronic device (such as a baby monitor), a portable computing device, an access point, a router, a switch, communication equipment, test equipment, a digital signal processor, a controller, a personal digital assistant, a laser printer (or other office equipment such as a photocopier), a personal organizer, a toy, a set-top box, a computing device (such as a laptop computer, a desktop computer, a server, and/or a subnotebook/netbook), a light (such as a nightlight), a space heater, an alarm, a smoke detector, a carbon-monoxide detector, an environmental monitoring device (which monitors an environmental condition in the environment that includes electronic device 1500), and/or another electronic device.

Although specific components are used to describe electronic device 1500, in alternative embodiments, different components and/or subsystems may be present in electronic device 1500. For example, electronic device 1500 may include one or more additional processing subsystems, memory subsystems, networking subsystems, power subsystems, sensor subsystems and/or sensory-output subsystems. Moreover, one or more of the subsystems may not be present in electronic device 1500. Furthermore, in some embodiments, electronic device 1500 may include one or more additional subsystems that are not shown in FIG. 15 such as a user-interface subsystem, a display subsystem, and/or a feedback subsystem (which may include speakers and/or an optical source).

Figure 15:
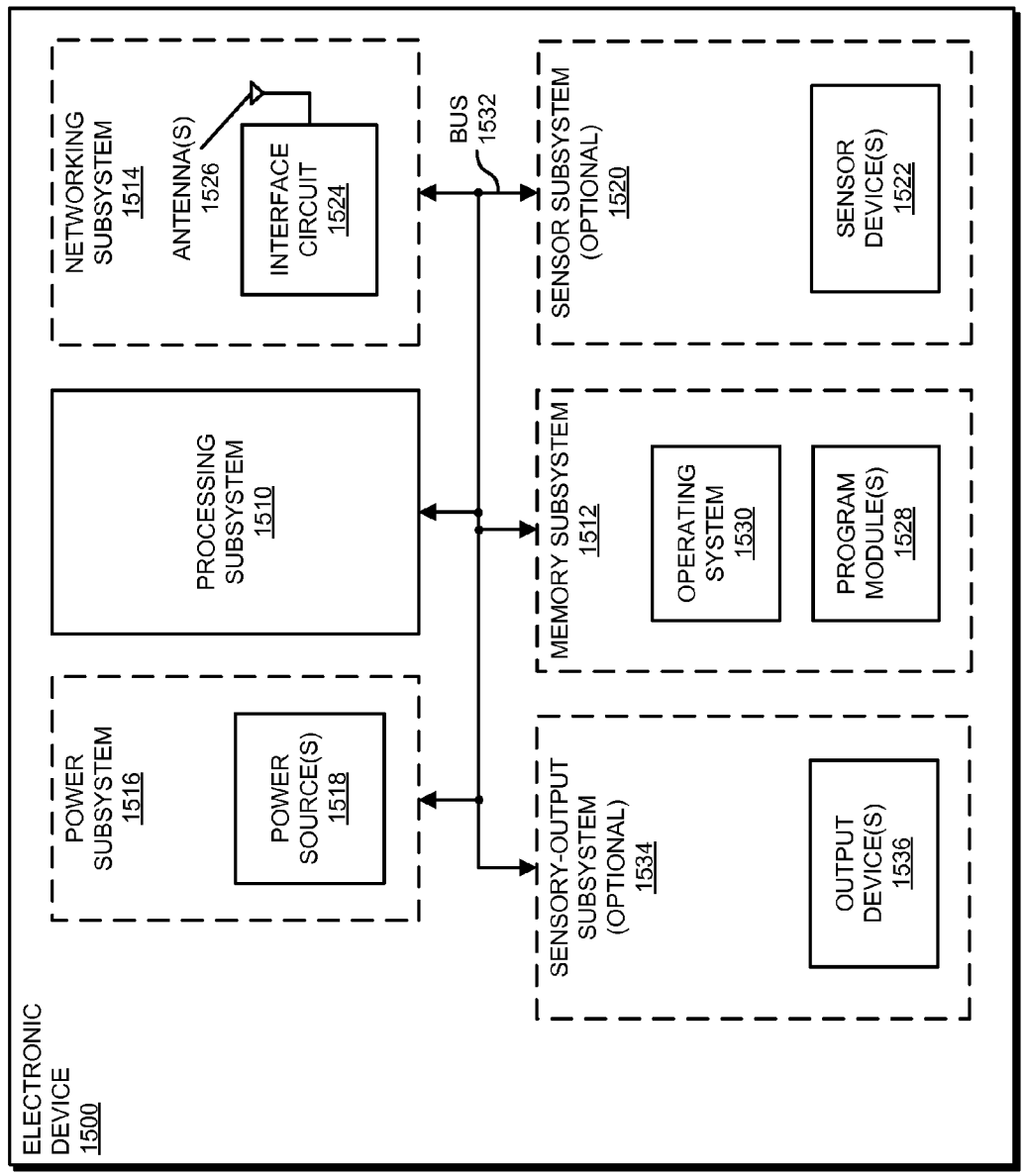
FIG. 15 is a block diagram illustrating an electronic device in FIG. 1 in accordance with an embodiment of the present disclosure.

Although separate subsystems are shown in FIG. 15, in some embodiments, some or all of a given subsystem or component can be integrated into one or more of the other subsystems or component(s) in electronic device 1500. For example, in some embodiments program module 1528 is included in operating system 1530. In some embodiments, a component in a given subsystem is included in a different subsystem.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1514, such as one or more radios. Moreover, the integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the radios described in single-radio embodiments.

In some embodiments, networking subsystem 1514 and/or the integrated circuit include a configuration mechanism (such as one or more hardware and/or software mechanisms) that configures the radios to transmit and/or receive on a given channel (e.g., at a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, etc.)

The described embodiments of the environmental monitoring technique and the association technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the environmental monitoring technique and the association technique may be implemented using program module 1528, operating system 1530 (such as drivers for interface circuit 1524) and/or in firmware in interface circuit 1524. Alternatively or additionally, at least some of the operations in the environmental monitoring technique and the association technique may be implemented in a physical layer, such as hardware in interface circuit 1524.

Note that the functions of electronic device 1500 may be distributed over a large number of servers or computers, with various groups of the servers or computers performing particular subsets of the functions. These servers or computers may be at one or more locations. Thus, in some embodiments electronic device 1500 includes a computer system.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A controller electronic device, comprising:
an interface circuit that, during operation, communicates with a viewing electronic device that operates in a viewing mode, a monitoring electronic device associated with the viewing electronic device that operates in a monitoring mode in an environment, and second monitoring electronic devices that operate in the monitoring mode in second environments;
a processor electrically coupled to the interface circuit; and
memory, electrically coupled to the processor, which stores a program module that, during operation, is executed by the processor, wherein the program module includes:
instructions for receiving messages that include timestamps and current locations of the monitoring electronic device;
instructions for associating the viewing electronic device with a subset of the second monitoring electronic devices based on a duration of time that the monitoring electronic device is approximately at a fixed location, wherein a size of the subset increases as the duration of time increases, and wherein the associations allow the viewing electronic device to selectively access content, including acoustic information corresponding to sound and images for the second environments, from the subset of the second monitoring electronic devices; and
instructions for removing the associations when a difference between a current location of the monitoring electronic device and the fixed location exceeds a predefined value.

2. The controller electronic device of claim 1, wherein the subset of the second monitoring electronic devices is located within a distance from the fixed location; and
wherein the distance increases as the duration of time increases.

3. The controller electronic device of claim 1, wherein the subset of the second monitoring electronic devices is located within an adjacency value from the fixed location; and
wherein the adjacency value increases as the duration of time increases.

4. The controller electronic device of claim 1, wherein the program module further comprises instructions for receiving credentials from the viewing electronic device and the subset of the second monitoring electronic devices; and
wherein associating the viewing electronic device and the subset of the second monitoring electronic devices involves providing the credentials to the viewing electronic device and the subset of the second monitoring electronic devices.

5. The controller electronic device of claim 4, wherein the program module further comprises instructions for receiving encryption keys from the viewing electronic device and the subset of the second monitoring electronic devices; and
wherein associating the viewing electronic device and the subset of the second monitoring electronic devices involves providing the encryption keys to the viewing electronic device and the subset of the second monitoring electronic devices.

6. The controller electronic device of claim 4, wherein the program module further comprises instructions for generating encryption keys for the viewing electronic device and the subset of the second monitoring electronic devices; and
wherein associating the viewing electronic device and the subset of the second monitoring electronic devices involves providing the encryption keys to the viewing electronic device and the subset of the second monitoring electronic devices.

7. The controller electronic device of claim 1, wherein the program module further comprises instructions for associating the monitoring electronic device with a second viewing electronic device that is associated with one of the second monitoring electronic devices; and
wherein the association between the monitoring electronic device with the second viewing electronic device allows the second viewing electronic device to selectively access content, including images and acoustic information corresponding to sound, for the environment.

8. The controller electronic device of claim 7, wherein the program module further comprises instructions for receiving credentials from the monitoring electronic device and the second viewing electronic device; and
wherein associating the monitoring electronic device and the second viewing electronic device involves providing the credentials to the monitoring electronic device and the second viewing electronic device.

9. The controller electronic device of claim 8, wherein the program module further comprises instructions for receiving encryption keys from the monitoring electronic device and the second viewing electronic device, and
wherein associating the monitoring electronic device and the second viewing electronic device involves providing the encryption keys to the monitoring electronic device and the second viewing electronic device.

10. The controller electronic device of claim 8, wherein the program module further comprises instructions for generating encryption keys for the monitoring electronic device and the second viewing electronic device; and
wherein associating the monitoring electronic device and the second viewing electronic device involves providing the encryption keys to the monitoring electronic device and the second viewing electronic device.

11. The controller electronic device of claim 1, wherein, by receiving the messages and associating the viewing electronic device with the subset of the second monitoring electronic devices, the controller electronic device establishes selective access to the content when the viewing electronic device is outside of communication range with the subset of the second monitoring electronic devices.

12. A computer-program product for use in conjunction with a controller electronic device, the computer-program product comprising a non-transitory computer-readable storage medium and a computer-program mechanism embedded therein to facilitate environmental monitoring, the computer-program mechanism including:
instructions for receiving messages that include timestamps and current locations of a monitoring electronic device that operates in a monitoring mode in an environment, wherein the monitoring electronic device is associated with a viewing electronic device that operates in a viewing mode;
instructions for associating the viewing electronic device with a subset of second monitoring electronic devices that operate in the monitoring mode in second environments based on a duration of time that the monitoring electronic device is approximately at a fixed location, wherein a size of the subset increases as the duration of time increases, and wherein the associations allow the viewing electronic device to selectively access content, including acoustic information corresponding to sound and images for the second environments, from the subset of the second monitoring electronic devices; and instructions for removing the associations when a difference between a current location of the monitoring electronic device and the fixed location exceeds a predefined value.

13. The computer-program product of claim 12, wherein the subset of the second monitoring electronic devices are located within a distance from the fixed location; and wherein the distance increases as the duration of time increases.

14. The computer-program product of claim 12, wherein the subset of the second monitoring electronic devices are located within an adjacency value from the fixed location; and wherein the adjacency value increases as the duration of time increases.

15. The computer-program product of claim 12, wherein the computer-program mechanism further comprises instructions for receiving credentials from the viewing electronic device and the subset of the second monitoring electronic devices; and wherein associating the viewing electronic device and the subset of the second monitoring electronic devices involves providing the credentials to the viewing electronic device and the subset of the second monitoring electronic devices.

16. The computer-program product of claim 15, wherein the computer-program mechanism further comprises instructions for receiving encryption keys from the viewing electronic device and the subset of the second monitoring electronic devices; and wherein associating the viewing electronic device and the subset of the second monitoring electronic devices involves providing the encryption keys to the viewing electronic device and the subset of the second monitoring electronic devices.

17. The computer-program product of claim 15, wherein the computer-program mechanism further comprises instructions for generating encryption keys for the viewing electronic device and the subset of the second monitoring electronic devices; and wherein associating the viewing electronic device and the subset of the second monitoring electronic devices involves providing the encryption keys to the viewing electronic device and the subset of the second monitoring electronic devices.

18. The computer-program product of claim 12, wherein the computer-program mechanism further comprises instructions for associating the monitoring electronic device with a second viewing electronic device that is associated with one of the subset of the second monitoring electronic devices; and wherein the association between the monitoring electronic device with the second viewing electronic device allows the second viewing electronic device to selectively access content, including images and acoustic information corresponding to sound, for the environment.

19. The computer-program product of claim 18, wherein the computer-program mechanism further comprises instructions for receiving credentials from the monitoring electronic device and the second viewing electronic device; and wherein associating the monitoring electronic device and the second viewing electronic device involves providing the credentials to the monitoring electronic device and the second viewing electronic device.

20. A computer-system-implemented method for facilitating environmental monitoring, wherein the method comprises:

receiving messages that include timestamps and current locations of a monitoring electronic device that operates in a monitoring mode in an environment, wherein the monitoring electronic device is associated with a viewing electronic device that operates in a viewing mode;

associating the viewing electronic device with a subset of second monitoring electronic devices that operate in the monitoring mode in second environments based on a duration of time that the monitoring electronic device is approximately at a fixed location, wherein a size of the subset increases as the duration of time increases, and wherein the associations allow the viewing electronic device to selectively access content, including acoustic information corresponding to sound and images for the second environments, from the subset of the second monitoring electronic devices; and removing the associations when a difference between a current location of the monitoring electronic device and the fixed location exceeds a predefined value.

* * * * *